US010454519B2

(12) United States Patent
Taherzadeh Boroujeni et al.

(10) Patent No.: US 10,454,519 B2
(45) Date of Patent: Oct. 22, 2019

(54) METHOD AND APPARATUS FOR FLEXIBLE SPARSE CODE MULTIPLE ACCESS CODEBOOK DESIGN, TRANSMISSION AND DETECTION

(71) Applicant: Huawei Technologies Co., Ltd., Shenzhen (CN)

(72) Inventors: Mahmoud Taherzadeh Boroujeni, San Diego, CA (US); Alireza Bayesteh, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/156,615

(22) Filed: Oct. 10, 2018

(65) Prior Publication Data
US 2019/0044571 A1 Feb. 7, 2019

Related U.S. Application Data

(63) Continuation of application No. PCT/CN2017/084933, filed on May 18, 2017.
(Continued)

(51) Int. Cl.
*H04K 1/10* (2006.01)
*H04L 27/28* (2006.01)
(Continued)

(52) U.S. Cl.
CPC .......... *H04B 1/707* (2013.01); *H04L 29/08* (2013.01); *H04B 2201/709718* (2013.01); *H04J 2011/0009* (2013.01)

(58) Field of Classification Search
CPC ........ H04B 1/707; H04B 2201/709718; H04B 7/068; H04L 29/08; H04L 5/001;
(Continued)

(56) References Cited

U.S. PATENT DOCUMENTS

2003/0103584 A1* 6/2003 Bjerke ................. H04L 1/0003
375/340
2005/0047514 A1* 3/2005 Bolinth ................ H04L 1/005
375/261
(Continued)

FOREIGN PATENT DOCUMENTS

CN 104735652 A 6/2015
EP 2587754 A1 5/2013
(Continued)

OTHER PUBLICATIONS

U.S. Appl. No. 16/123,895, filed Sep. 6, 2018.*
(Continued)

*Primary Examiner* — Phuong Phu
(74) *Attorney, Agent, or Firm* — Slater Matsil, LLP

(57) ABSTRACT

Forward error correction encoding is applied to a first stream of input bits associated with a first data layer to generate a first stream of coded bits. The first steam of coded bits is mapped to K1 binary streams. A first layer-specific set of stream-specific modulators are applied to the K1 binary streams to generate K1 independent complex-valued symbol streams. The symbol streams are transmitted using T1 resource elements out of N1 resource elements. The T1 resource elements are defined by a first layer-specific signature of length N1, where 1≤T1<N1. The same process may also be carried out for a second stream of input bits associated with a second data layer using a second layer-specific set of stream-specific modulators and a second layer-specific signature, which may differ from the first layer-specific signature in terms of sparsity pattern and/or sparsity level.

31 Claims, 19 Drawing Sheets

Related U.S. Application Data

(60) Provisional application No. 62/339,275, filed on May 20, 2016, provisional application No. 62/377,019, filed on Aug. 19, 2016.

(51) Int. Cl.
*H04B 1/707* (2011.01)
*H04L 29/08* (2006.01)
*H04J 11/00* (2006.01)

(58) Field of Classification Search
CPC ... H04L 1/0041; H04L 1/0004; H04L 1/0003; H04L 1/005; H04J 2011/0009
USPC ............ 375/260, 261, 264, 267, 298, 299
See application file for complete search history.

(56) References Cited

U.S. PATENT DOCUMENTS

| | | | | |
|---|---|---|---|---|
| 2007/0076587 | A1* | 4/2007 | Kwon | H04L 1/0004 370/208 |
| 2012/0307760 | A1* | 12/2012 | Han | H04L 5/001 370/329 |
| 2012/0320951 | A1* | 12/2012 | Han | H04L 1/0041 375/141 |
| 2013/0148614 | A1* | 6/2013 | Noh | H04L 5/001 370/329 |
| 2014/0140360 | A1 | 5/2014 | Nikopour et al. | |
| 2015/0139348 | A1* | 5/2015 | Tong | H04B 7/068 375/267 |
| 2016/0050039 | A1 | 2/2016 | Ma et al. | |

FOREIGN PATENT DOCUMENTS

| | | |
|---|---|---|
| WO | 2011056022 A2 | 5/2011 |
| WO | 2013060571 A1 | 5/2013 |

OTHER PUBLICATIONS

U.S. Appl. No. 16/119,841, filed Aug. 31, 2018.*
Nikopour, et al., "Sparse Code Multiple Access," 2013 IEEE 24th International Symposium on Personal, Indoor and Mobile Radio Communications: Fundamentals and PHY Track, Sep. 8, 2013, 5 pages.
Chung, et al., "Optical Orthogonal Codes: Design, Analysis, and Applications," IEEE Transactions on Informatoin Theory, vol. 35, No. 3, May 1989, 10 pages.

* cited by examiner

METHOD AND APPARATUS FOR FLEXIBLE SPARSE CODE MULTIPLE ACCESS CODEBOOK DESIGN, TRANSMISSION AND DETECTION

CROSS-REFERENCE TO RELATED APPLICATIONS

This application is a continuation of PCT Application No. PCT/CN2017/084933, entitled, "Method for Flexible Sparse Code Multiple Access Codebook Design, Transmission and Detection," filed May 18, 2017, which claims the benefit of U.S. Provisional Application Ser. No. 62/339,275, entitled "Method and System for Flexible Sparse Code Multiple Access," filed on May 20, 2016, and U.S. Provisional Application Ser. No. 62/377,019, entitled "Method for Flexible Sparse Code Multiple Access Codebook Design, Transmission and Detection," filed on Aug. 19, 2016, all of which applications are hereby incorporated herein by reference.

TECHNICAL FIELD

This application relates generally to digital communications, and more particularly to methods and apparatus for spreading a signal and multiplexing a plurality of signals that are to be transmitted.

BACKGROUND

Spreading of a signal over multiple time/frequency resources is performed for the purpose of achieving higher diversity, reliability and robustness to interference and channel variations.

Code division multiple access (CDMA) is a multiple access technique in which data symbols are spread over orthogonal or near-orthogonal code sequences. Conventional CDMA encoding is a two-step process in which a binary code is mapped to a quadrature amplitude modulation (QAM) symbol before a spreading sequence is applied. CDMA can be considered a form of repetition of QAM symbols by using different amplitudes and phases in accordance with the spreading sequence.

Conventional CDMA encoding can provide relatively high throughput. However, new techniques/mechanisms for achieving even higher throughputs may be desirable to meet the ever-growing demands of next-generation wireless networks. Low density spreading (LDS) is a form of CDMA used for multiplexing different layers of data. LDS uses repetitions of the same symbol on layer-specific nonzero positions in time or frequency. As an example, in LDS-orthogonal frequency division multiplexing (OFDM) a constellation point is repeated over nonzero frequency tones of an LDS block. This sparse spreading helps reduce the decoding complexity when many (e.g., more than the spreading length) LDS signals are multiplexed together.

In sparse code multiple access (SCMA), a multidimensional codebook is used to spread data over tones without necessarily repeating symbols. In SCMA the multidimensional spreading codebooks are sparse and hence detection can be made simpler. SCMA allows the encoding of data using a subset of tones from a larger set, so as to improve overall performance when viewed as a trade-off between error rate and throughput. One of the properties of SCMA is that larger and more complex constellations can be formed from multiple tones. However, although this may increase throughput, it also consumes valuable computational resources and may perform sub-optimally with low complexity receivers.

Therefore, there is still a need for non-orthogonal multiple access solution that maintains the good performance that is due to efficient multi-dimensional modulation, and is flexible for addressing various next generation application scenarios and multi-user multiplexing.

SUMMARY

One aspect of the present disclosure provides a method in a transmitter. In one embodiment, the method includes applying forward error correction (FEC) encoding to a first stream of input bits associated with a first data layer to generate a first stream of coded bits. The first stream of coded bits is then mapped to $K_1$ binary streams. A first layer-specific set of stream-specific modulators is applied to the $K_1$ binary streams to generate $K_1$ independent complex-valued symbol streams. The $K_1$ independent complex-valued symbol streams are transmitted using $T_1$ resource elements out of $N_1$ resource elements. The $T_1$ resource elements may be defined by a first layer-specific signature of length $N_1$, where $1 \le T_1 < N_1$.

In any of the previous embodiments of a method in a transmitter, at least one of the first layer-specific signature and the first layer-specific set of stream-specific modulators may be selected based at least in part on at least one of: a layer index associated with the first data layer; a coding rate of the FEC encoding applied to the first stream of input bits; and a target spectral efficiency.

In any of the previous embodiments of a method in a transmitter, the $T_1$ resource elements out of $N_1$ resource elements may include $T_1$ tones out of $N_1$ OFDM tones.

In any of the previous embodiments of a method in a transmitter, the stream-specific modulators are applied by quadrature amplitude modulation (QAM) mappers.

In any of the previous embodiments of a method in a transmitter, mapping the first stream of coded bits to $K_1$ binary streams may involve mapping the first stream of coded bits to $K_1$ binary streams such that at least one coded bit is mapped to more than one of the $K_1$ binary streams and none of the $K_1$ binary streams are identical to each other.

In any of the previous embodiments of a method in a transmitter, mapping the first stream of coded bits to $K_1$ binary streams may involve dividing the first stream of coded bits to $K_1$ disjoint binary streams.

In any of the previous embodiments of a method in a transmitter, the method may further include assigning stream-specific transmit powers to the $K_1$ independent complex-valued symbol streams prior to transmission.

In any of the previous embodiments of a method in a transmitter, the method may further include assigning stream-specific phase rotations to the $K_1$ independent complex-valued symbol streams prior to transmission.

In any of the previous embodiments of a method in a transmitter, the method may further include mapping a second stream of coded bits associated with a second data layer to $K_2$ binary streams. A second layer-specific set of stream-specific modulators may be applied to the $K_2$ binary streams to generate $K_2$ independent complex-valued symbol streams. In addition, the $K_2$ independent complex-valued symbol streams may be transmitted using $T_2$ resource elements out of $N_2$ resource elements. The $T_2$ resource elements may be defined by a second layer-specific signature of length $N_2$, where $1 \leq T_2 \leq N_2$. The first and second layer-specific signatures may differ in terms of sparsity pattern and/or sparsity level.

In any of the previous embodiments of a method in a transmitter, the first and second layer-specific sets of stream-specific modulators may differ in terms of a sequence of the stream-specific modulators in each set and/or a proportion of different stream-specific modulators in each set.

In any of the previous embodiments of a method in a transmitter, the method may further include assigning at least one of layer-specific transmit powers and layer-specific phase rotations to the independent complex-valued symbol streams prior to transmission.

Another aspect of the present disclosure provides an apparatus that includes a bit mapper, a first layer-specific set of stream-specific modulators, and a transmitter. The bit mapper maps a first stream of coded bits associated with a first data layer to $K_1$ binary streams. The first layer-specific set of stream-specific modulators generates $K_1$ independent complex-valued symbol streams based on the $K_1$ binary streams. The transmitter transmits the $K_1$ independent complex-valued symbol streams using $T_1$ resource elements out of $N_1$ resource elements, the $T_1$ resource elements being defined by a first layer-specific signature of length $N_1$, where $1 \leq T_1 < N_1$.

In any of the previous embodiments of the apparatus, the apparatus may further include a controller to configure the bit mapper and the first layer-specific set of stream-specific modulators based at least in part on a layer index associated with the first data layer, a coding rate of the FEC encoding applied to the first stream of input bits, and/or a target spectral efficiency.

In any of the previous embodiments of the apparatus, the $T_1$ resource elements out of $N_1$ resource elements may include $T_1$ tones out of $N_1$ tones.

In any of the previous embodiments of the apparatus, the stream-specific modulators may be quadrature amplitude modulation (QAM) mappers.

In any of the previous embodiments of the apparatus, the bit mapper may map the first stream of coded bits to $K_1$ binary streams such that at least one coded bit is mapped to more than one of the $K_1$ binary streams and none of the $K_1$ binary streams are identical to each other.

In any of the previous embodiments of the apparatus, the bit mapper may divide the first stream of coded bits to $K_1$ disjoint binary streams.

In any of the previous embodiments of the apparatus, the apparatus may further include a power scaler, operatively coupled between the modulators and the transmitter, to assign stream-specific transmit powers to the $K_1$ independent complex-valued symbol streams prior to transmission.

In any of the previous embodiments of the apparatus, the apparatus may further include a phase rotator, operatively coupled between the modulators and the transmitter, to assign stream-specific phase rotations to the $K_1$ independent complex-valued symbol streams prior to transmission.

In any of the previous embodiments of the apparatus, the apparatus may further include a second bit mapper and a second layer-specific set of stream-specific modulators operatively coupled to the second bit mapper. In such embodiments, the second bit mapper may map a second stream of coded bits associated with a second data layer to $K_2$ binary streams, and the second layer-specific set of stream-specific modulators may generate $K_2$ independent complex-valued symbol streams based on the $K_2$ binary streams. The transmitter is operatively coupled to the second layer-specific set of stream-specific modulators and transmits the $K_2$ independent complex-valued symbol streams using $T_2$ resource elements out of $N_2$ resource elements. The $T_2$ resource elements may be defined by a second layer-specific signature of length $N_2$, where $1 \leq T_2 \leq N_2$. The first and second layer-specific signatures may differ in terms of sparsity pattern and/or sparsity level.

In any of the previous embodiments of the apparatus, the first and second layer-specific sets of stream-specific modulators may differ in terms of a sequence of the stream-specific modulators in each set and/or a proportion of different stream-specific modulators in each set.

In any of the previous embodiments of the apparatus, the apparatus may further include: a first power scaler, operatively coupled between the first layer-specific set of stream-specific modulators and the transmitter, to assign a first layer-specific vector of stream-specific transmit powers to the $K_1$ independent complex-valued symbol streams prior to transmission; and a second power scaler, operatively coupled between the second layer-specific set of stream-specific modulators and the transmitter, to assign a second layer-specific vector of stream-specific transmit powers to the $K_2$ independent complex-valued symbol streams prior to transmission.

In any of the previous embodiments of the apparatus, the apparatus may further include: a first phase rotator, operatively coupled between the first layer-specific set of stream-specific modulators and the transmitter, to assign a first layer-specific vector of stream-specific phase rotations to the $K_1$ independent complex-valued symbol streams prior to transmission; and a second phase rotator, operatively coupled between the second layer-specific set of stream-specific modulators and the transmitter, to assign a second layer-specific vector of stream-specific phase rotations to the $K_1$ independent complex-valued symbol streams prior to transmission.

Yet another aspect of the present disclosure provides a method in a receiver. In one embodiment, the method includes receiving a signal that includes at least one layer-specific set of independent complex-valued symbol streams transmitted using a layer-specific set of resource elements of a shared resource. A resource element-by-resource element maximum a posteriori probability (MAP) algorithm is applied to the received signal to generate input bit log likelihood ratios (LLRs), which are fed to FEC decoders to generate output bit LLRs. A first stream of input bits associated with a first data layer may then be determined based on the output bit LLRs from the FEC decoder associated with the first data layer.

In any of the previous embodiments of a method in a receiver, applying a resource element-by-resource element MAP algorithm to the received signal may include: calculating extrinsic LLRs based on the output bit LLRs and the input bit LLRs; and calculating, based on the extrinsic LLRs, a priori probabilities for a next iteration of the MAP algorithm.

In any of the previous embodiments of a method in a receiver applying a resource element-by-resource element MAP algorithm to the received signal may involve, for each resource element, applying the MAP algorithm over only a subset of active layers, treating other layers as interference.

In any of the previous embodiments of a method in a receiver, applying the MAP algorithm over only a subset of active layers may involve using resource element-based selection to select the subset of active layers for each resource element.

In any of the previous embodiments of a method in a receiver, using resource element-based selection to select the subset of active layers for each resource element may involve, for each resource element, selecting the subset of active layers based on the signal to interference plus noise ratio (SINR) of the active layers.

In any of the previous embodiments of a method in a receiver, applying the MAP algorithm over only a subset of active layers may involve using layer-based selection to select the subset of active layers for all resource elements.

In any of the previous embodiments of a method in a receiver, using layer-based selection to select the subset of active layers for all resource elements may involve selecting the subset of active layers based on average SINR or average normalized capacity of the active layers over the resource elements.

In any of the previous embodiments of a method in a receiver, the method may further include selecting the number of active layers in the subset of active layers based on at least one of a complexity constraint of a receiver and an order of stream-specific modulators used to generate layer-specific sets of independent complex-valued symbol streams.

Still another aspect of the present disclosure provides an apparatus that includes a receiver, a set of FEC decoders and a quantizer. The receiver is configured to apply a resource element-by-resource element maximum a posteriori probability (MAP) algorithm to a received signal that includes at least one layer-specific set of independent complex-valued symbol streams transmitted using a layer-specific set of resource elements of a shared resource. The receiver generates input bit log likelihood ratios (LLRs) that are fed to the FEC decoders, which generate output bit LLRs based on the input bit LLRs. The quantizer determines a first stream of input bits associated with a first data layer based on the output bit LLRs from the FEC decoder associated with the first data layer.

In any of the previous embodiments of the apparatus, the receiver may be configured to: calculate extrinsic LLRs based on the output bit LLRs and the input bit LLRs; and calculate, based on the extrinsic LLRs, a priori probabilities for a next iteration of the MAP algorithm.

In any of the previous embodiments of the apparatus, for each resource element, the receiver may be configured to apply the MAP algorithm over only a subset of active layers, treating other layers as interference.

In any of the previous embodiments of the apparatus, the receiver may use resource element-based selection to select the subset of active layers for each resource element.

In any of the previous embodiments of the apparatus, for each resource element, the receiver may select the subset of active layers based on the SINR of the active layers.

In any of the previous embodiments of the apparatus, the receiver may use layer-based selection to select the subset of active layers for all resource elements.

In any of the previous embodiments of the apparatus, the receiver may select the subset of active layers based on average SINR or average normalized capacity of the active layers over the resource elements.

In any of the previous embodiments of the apparatus, the receiver may select the number of active layers in the subset of active layers based on at least one of a complexity constraint of the receiver and an order of stream-specific modulators used to generate layer-specific sets of independent complex-valued symbol streams.

Aspects and features of the present disclosure will become apparent, to those ordinarily skilled in the art, upon review of the following description of the various embodiments of the disclosure.

BRIEF DESCRIPTION OF THE DRAWINGS

Embodiments will be described in greater detail with reference to the accompanying drawings.

FIGS. 3A and 3B show examples of sparse layer-specific signatures.

DETAILED DESCRIPTION OF ILLUSTRATIVE EMBODIMENTS

Figure 1:
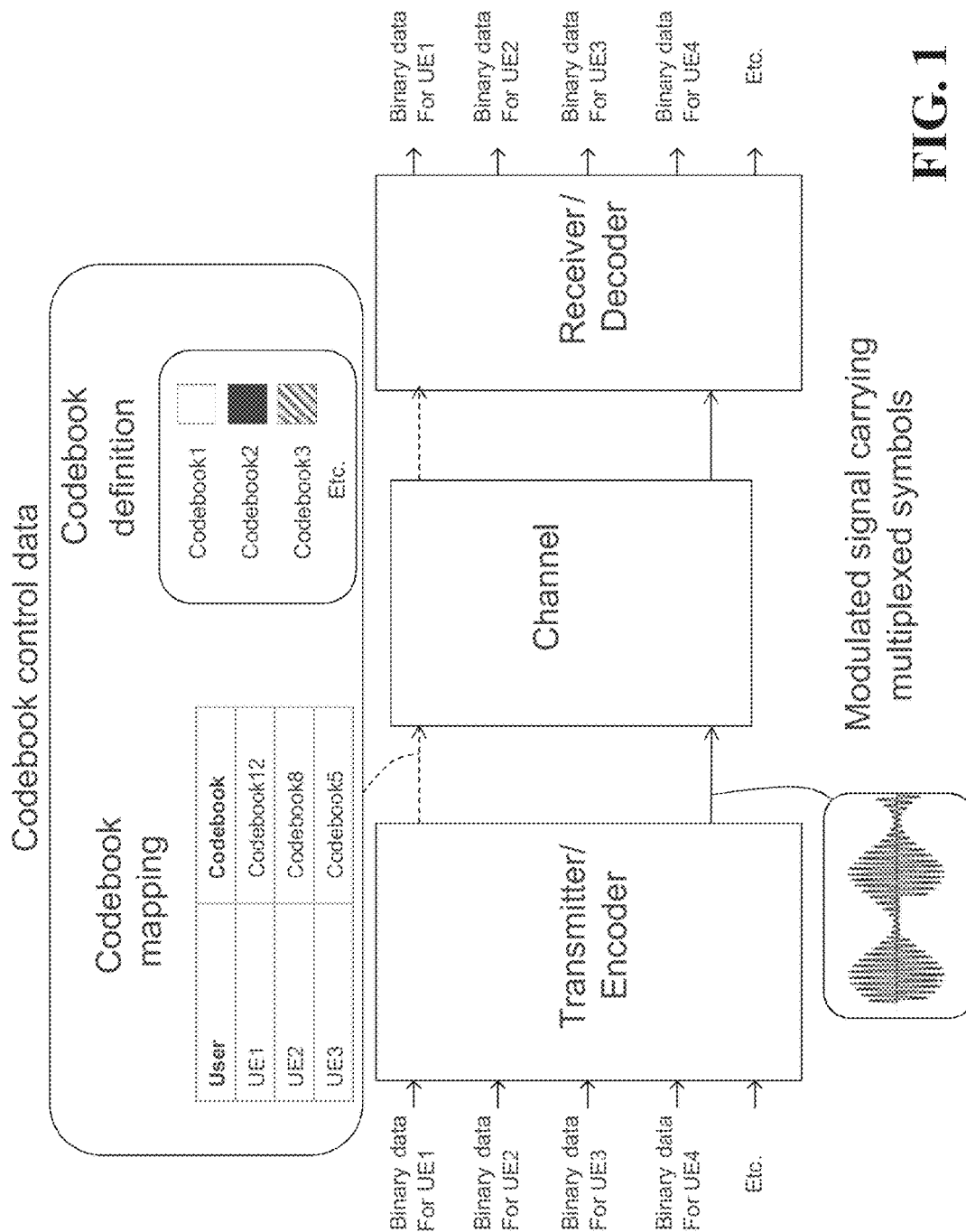
FIG. 1 is a block diagram of an example system in which embodiments could be implemented.

It should be understood at the outset that although illustrative implementations of one or more embodiments of the present disclosure are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalents.

Demand for higher data rates in telecommunications systems continues to increase. At the same time, more transmission flexibility and robustness toward network impairments is needed. Improvement in efficient signaling design for signal spreading and multi-user signal multiplexing is an area that could aid in meeting these demands.

Aspects of the present disclosure provide efficient signaling design for spreading. Signal spreading may provide more reliability, diversity and robustness towards network impairments. Multi-user signal multiplexing may provide more spectral efficiency, scheduling flexibility, robustness to channel state information (CSI) feedback accuracy, robustness to channel aging, and robustness to issues that may arise from UE mobility.

The embodiments set forth herein represent information sufficient to practice the claimed subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes volatile and non-volatile, removable and non-removable media implemented in any method or technology, such as magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Before discussing example embodiments of the present disclosure, various functional aspects of transmitting and receiving data spread over multiple time/frequency resources will be discussed to provide some additional context.

Certain aspects of the present disclosure focus on the encoding function of a transmitter. In particular, encoding is achieved by transforming streams of received binary data into streams of transmitted symbols. In the present disclosure, reference is made to binary data but in general, M-ary data may be used. FIG. 1 is a block diagram of a system that may be used for implementing certain devices and methods in accordance with certain embodiments of the present disclosure. In particular, there is shown a transmitter/encoder for encoding a plurality of data streams for various user equipments (UEs). Specifically, the transmitter/encoder receives binary (or M-ary data) for each of users UE1, UE2, UE3, UE4, etc. The transmitter/encoder may include suitable hardware and/or software configured to execute a variety of functions, such as forward error correction (FEC) encoding of the binary data for each stream, encoding and modulation of the forward error-corrected data for each stream into streams of symbols and multiplexing of plural streams of symbols into a composite/layered output signal for transmission to one or more receiving devices, e.g. UEs. The output signal is output by an output interface of the transmitter and travels to an input interface of a receiver over a communication channel established over one or more links and/or nodes.

Generally speaking, it can be said that the transmitter/encoder encodes data from each input stream by mapping this data to a sequence of transmitted symbols for that stream, and this may be done in parallel for multiple streams. The resulting sequences of symbols are then multiplexed into a signal for transmission over a shared resource channel.

A transmitted symbol is a modulated signal that encodes a group of bits according to a constellation diagram. Modulation occurs over a set of one or more resource elements (e.g., frequencies or tones) of the shared resource. The parameters of the constellation diagram and the set of tones used for modulation may be referred to as a "codebook". Generally speaking, different transmitters/encoders utilize different codebooks to facilitate differentiation at a receiver/decoder.

A receiver/decoder may include suitable hardware and/or software configured to execute a variety of functions that are basically the reverse of those performed by the transmitter, such as demultiplexing the composite/layered signal into multiple symbol streams, demodulating/decoding the symbol streams into binary data and error correcting the coded binary data, so as to result in binary data streams.

To enable proper decoding and demodulation, the receiver/decoder needs to know which codebooks are being used for which streams. As such, the association between UEs and codebooks (referred to as the "codebook mapping"), as well as the definitions of the codebooks themselves (referred to as the "codebook definition" and including the parameters of the constellation diagram and the identity of the tones used for modulation), need to be obtained by the receiver/decoder. This information is referred to as "codebook control data" and may be transmitted from the transmitter/encoder to the receiver/decoder over a control channel. This information may be updated as the need arises. In some cases, the receiver/decoder may perform blind decoding of the codebooks themselves and therefore such transmission of the codebooks from the transmitter/encoder to the receiver/decoder may not be required.

Figure 2:
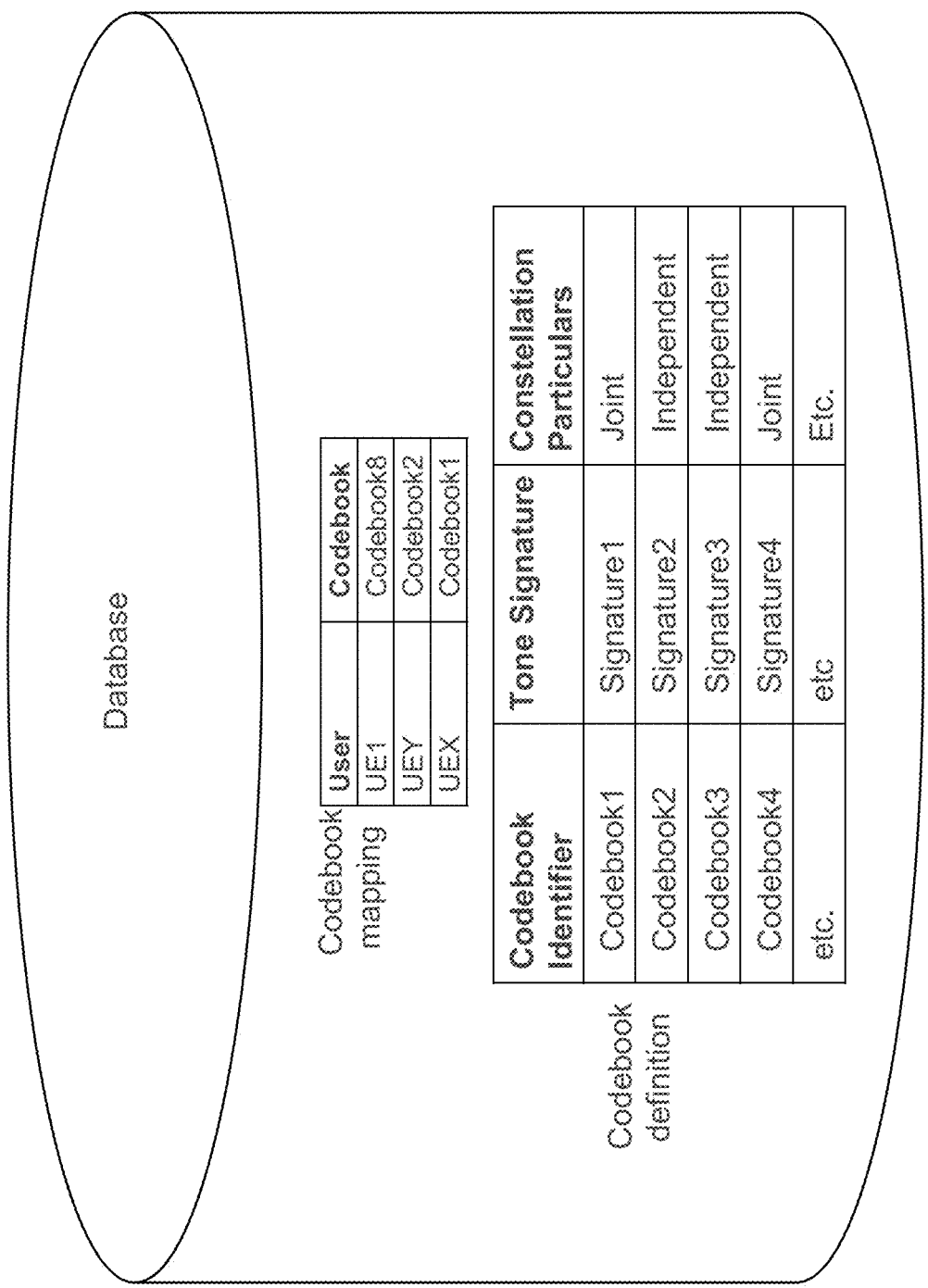
FIG. 2 shows a database storing codebook mappings and definitions.

As shown in FIG. 2, the codebook mapping and the codebook definition may be stored as a database or other object in memory at or accessible by the transmitter/encoder. It should be appreciated that the codebooks may change over time (i.e., they may be dynamic), or the codebooks may remain static but their association to different UEs may change over time (codebook hopping).

Figure 3A:
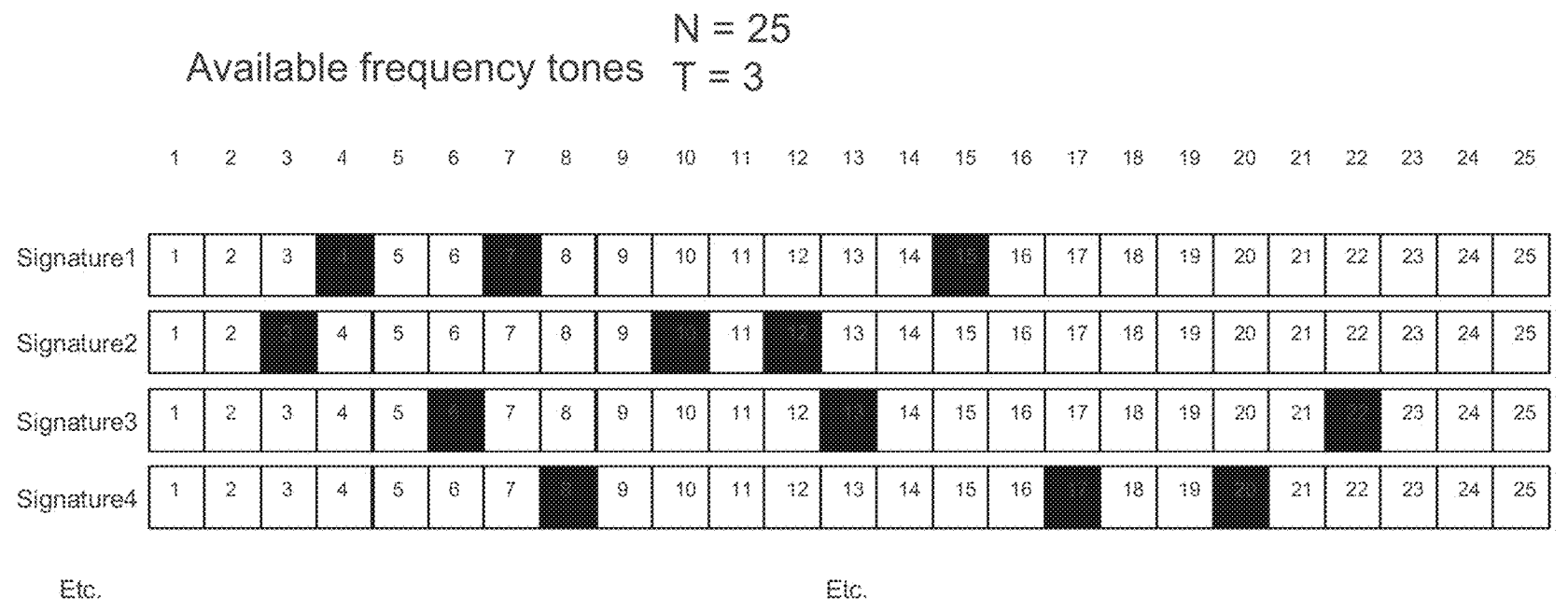

The codebook definition may associate each codebook with a codebook identifier (e.g., Codebook1, Codebook2, etc.), and an associated tone signature (e.g., Signature1, Signature2, etc.), i.e., a collection of tones used for the modulation scheme related to the codebook in question. In general there may be N available tones to choose from in the shared resource, but a constellation used to modulate the data for a particular UE may use only T tones. The T out of N tones is referred to as a "sparse set" of tones when T<N. For example, FIG. 3A shows an example where N is equal to 25 and T is equal to 3. In this example, Signature1 utilizes tones 4, 7 and 15, Signature2 utilizes tones 3, 10 and 12, etc. Generally speaking, T<N denotes a sparse set, but the definition of what constitutes a sparse subset can be adapted, and in different embodiments may be used to signify that T<0.5N, T<0.25N or T<0.1N, to give a few non-limiting examples. It should be appreciated that the set of available tones (including the identity of the tones and/or their overall number) may change over time.

Figure 3B:
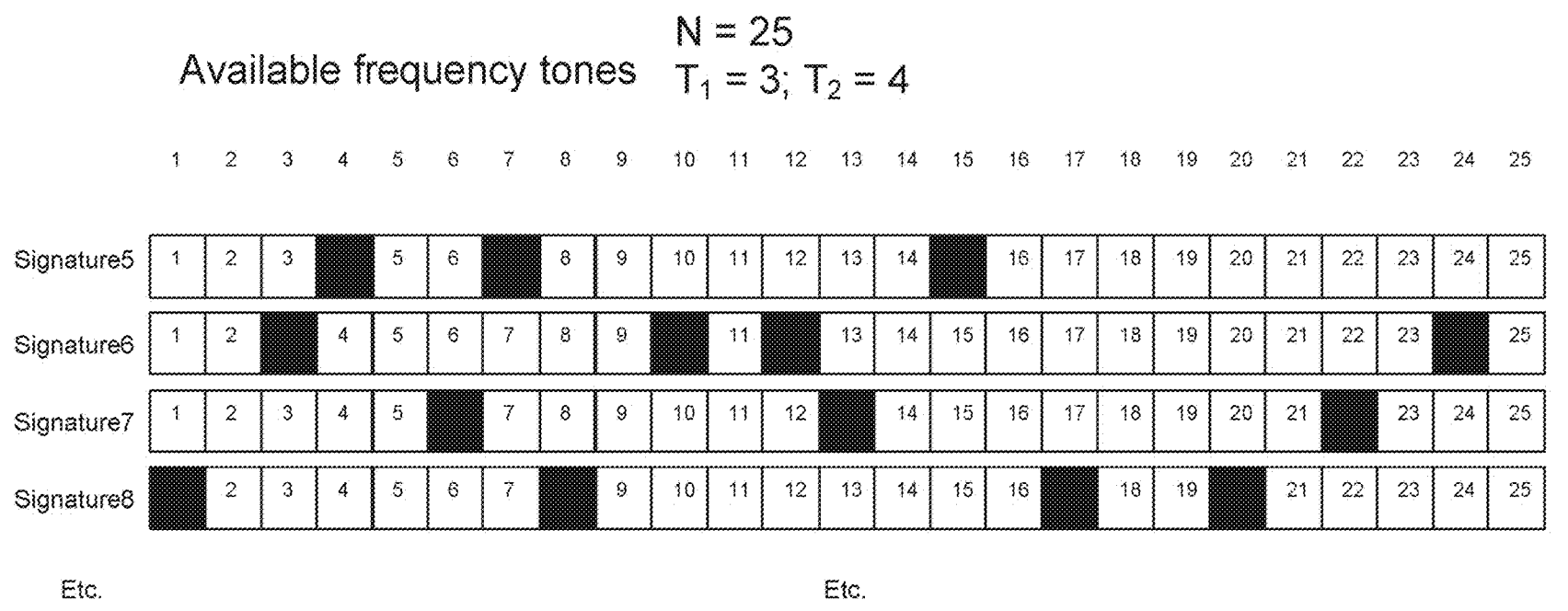

In some cases, there may be different numbers of tones per signature. For example, a signature may use $T_1$ or $T_2$ out of N tones in a sparse set of tones. With specific reference to FIG. 3B, N is equal to 25; $T_1$ is equal to 3 and $T_2$ is equal to 4. In this example, Signature5 ($T_1$=3) utilizes tones 4, 7 and 15, Signature6 ($T_2$=4) utilizes tones 3, 10, 12 and 24, Signature7 ($T_1$=3) utilizes tones 6, 13 and 22 and Signature8 ($T_2$=4) utilizes tones 1, 8, 17 and 20.

Figure 4:
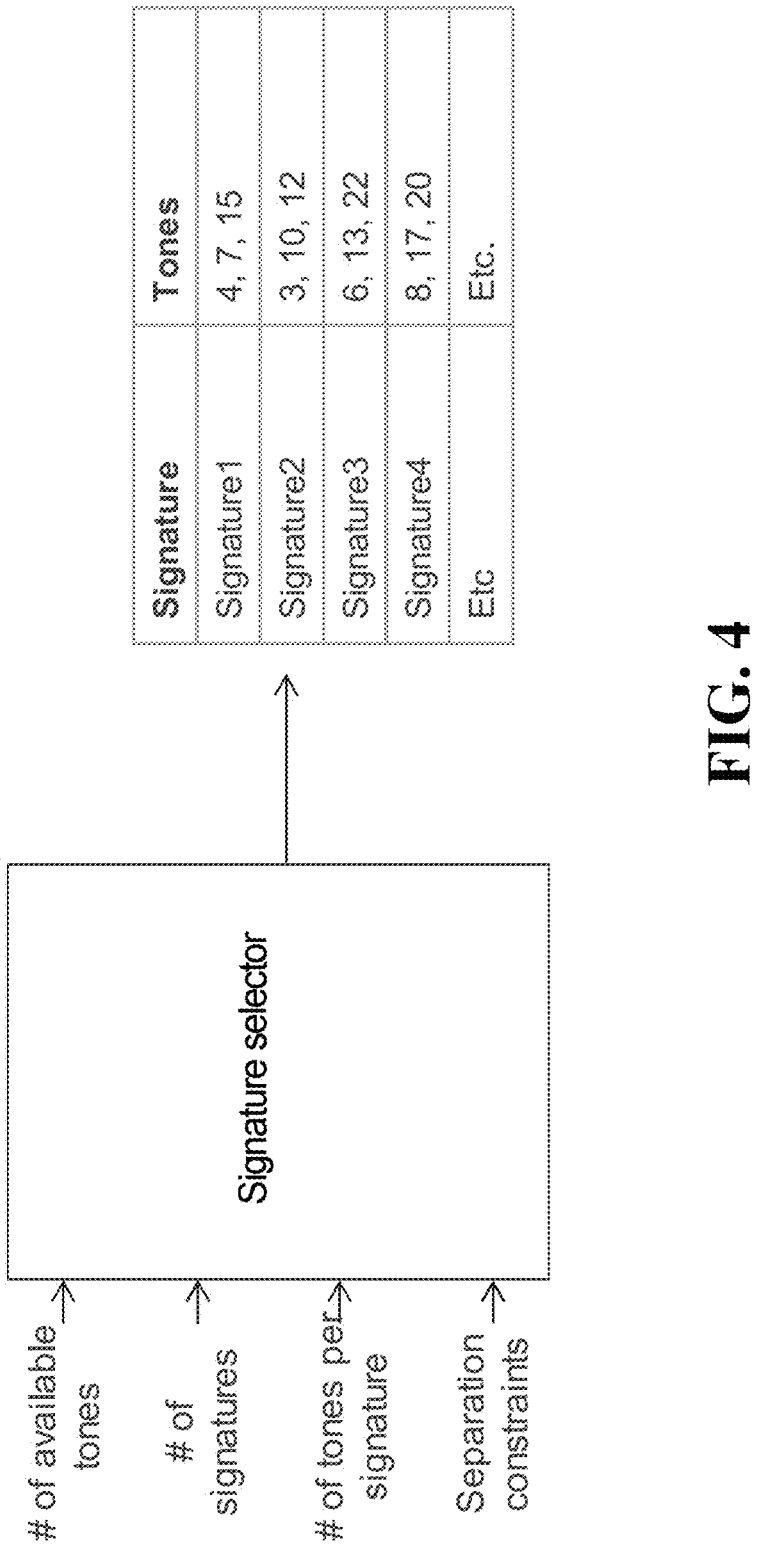
FIG. 4 shows a signature selector configured to select tones for layer-specific signatures.

To be resilient against interference, each UE may be assigned a signature, i.e., a distinct sparse set of tones that will be occupied by the transmitted symbols for that UE. This does not necessarily require that no tone can appear in more than one signature. Indeed, there are multiple ways in which to design the signatures given an initial available set of tones so as to meet operational requirements. One such manner is to implement a signature selector using a processor or other hardware and/or software, at any suitable location in the network. A block diagram of a signature selector is shown in FIG. 4. The signature selector may receive information regarding the number of available tones (N), the number of signatures that need to be created, the number of tones per signature (T) and so-called "separation constraints". The separation constraints may include, for example, the number of allowable overlapping tones amongst any pair of signatures and/or the minimum "distance" (in terms of number of intermediate unused tones) between two non-overlapping tones from different signatures. Other separation constraints may be imposed in addition to or instead of the foregoing, for example the closest allowable proximity between two tones within the same signature. Based on the aforesaid information, the signature selector determines the requisite number of signatures, which is expressed in FIG. 4 as a table that maps signatures to collections of tones.

In some cases, a transmitter may be assigned multiple signatures. For example, the binary (or M-ary) data for a single UE could be split over multiple component streams, each component stream being encoded with a different signature and/or a different codebook as described above.

The set of signatures may be viewed as a set of sequences that are already designed offline and have some property (e.g., limit on the number of nonzero tones and on the pairwise overlap among them). Many possible approaches may be used to design the signatures. For example, one may want to minimize the number of pair-wise joint tones across the set of signatures in order to minimize the probability of pair-wise catastrophic collisions, which can occur where multiple UEs are transmitting data using the same or overlapping tones. One solution is to use a variant of optical orthogonal codes (OOCs) which have been used in the context of Code Division Multiple Access (CDMA). (See Chung et al., "Optical Orthogonal Codes: Design, Analysis, and Applications", IEEE Trans. On Information Theory, Vol. 35, No. 3, May 1989, hereby incorporated by reference herein.) An OOC of (n, k, λ) is a family of sequences of length n containing n-k zeros and k ones whose pair-wise overlap among them and their cyclic shifts is at most λ. However, rather than consider a sequence's cyclic shifts before assessing viability of the sequence, one can actually use all the cyclic shifts of OOC sequences as different signatures themselves, which is unlike optical CDMA. For example, for a block of 25 tones, one can have 100 different sequences of 3 nonzero tones, such that each pair of sequences overlap at most in one nonzero tone (4 OOCs×25 cyclic shifts): {0,1,6}, {0,2,9}, {0,3,11}, {0,4,13}. When k=2, the cyclic shifts of an OOC of (n, 2, 1) amounts to the set of all combinations of 2 non-zero positions out of n tones.

Using the above approach, although the signatures are not orthogonal because some overlap is permitted, they are unique, which allows blind detection of active signatures by a receiver. For example, blind detection can be based on power detection by identifying active tones based on received signal power and matching sets of active tones to signatures.

In practice, the signatures may be designed offline and stored on the various devices that use them (transmitter/encoder and receiver/decoder). As such, a receiver will know the set of signatures. A transmitter may select the signatures it will use or the signatures may be assigned to it by a network node, such as a base station or a central unit.

With reference again to FIG. 2, the "Constellation Particulars" field is now discussed. It is recalled that in this illustrated embodiment, the Constellation Particulars field is shown as having a value of "Joint" or "Independent". With this in mind, consider a signature, such as Signature1, which is associated with a certain sparse subset of tones. There are at least two ways in which to encode binary data using these tones. One conventional way to encode binary data using a subset of tones associated with a signature (corresponding to a value of "Joint" in the "Constellation Particulars" field) utilizes a multi-dimensional modulation technique that uses a "mega-constellation" or "joint constellation" that is created from the entire set of tones in the signature. For example, because a 1-tone signature may be 2-dimensional (e.g., quadrature amplitude modulation (QAM), Quadrature Phase Shift Keying (QPSK), etc.), a 2-tone signature may be 4-dimensional and a 3-tone signature may be 6-dimensional, and so on. Generally speaking, the larger the joint constellation, the greater the number of input data bits that can be encoded by that constellation. This would amount to encoding the data by mapping it to a sequence of symbols, each symbol being "spread" over all the tones in the signature. This is the modulation technique that is utilized in conventional SCMA.

Figure 5:
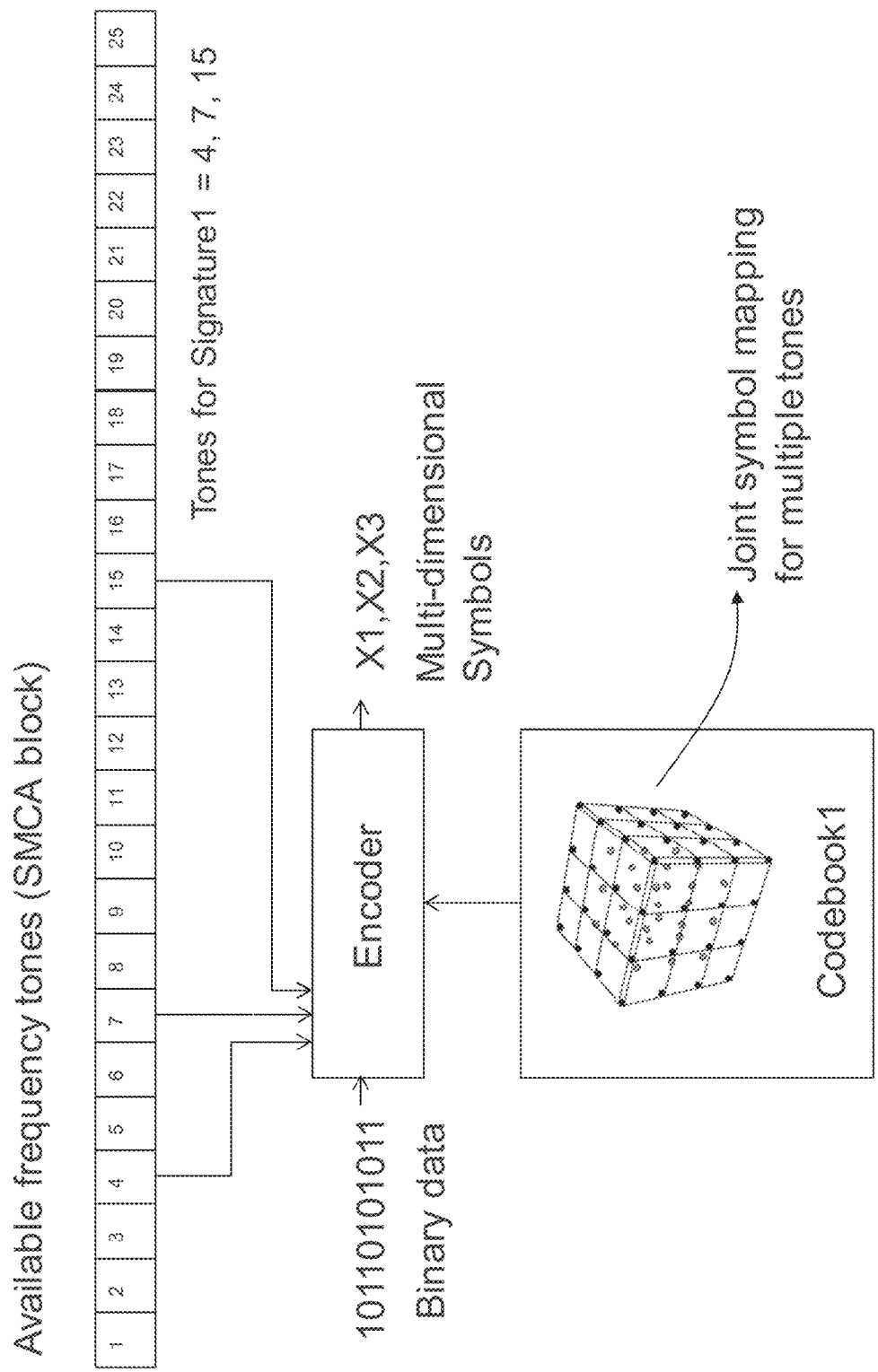
FIG. 5 shows an encoder configured to encode binary data using a subset of tones associated with a signature using a joint constellation.

FIG. 5 shows an example of an encoder configured to encode binary data using a subset of tones associated with a signature (Signature 1) using a joint constellation. FIG. 5 shows binary data being received at the encoder. The encoder may have access to a database (e.g., see FIG. 2) that includes a codebook mapping indicating that the received binary data is associated with a joint constellation (Codebook1). The encoder also knows, from the database, that the signature for Codebook1 is Signature1 (which corresponds to tones 4, 7 and 15, see FIG. 3A) and that the "Constellation Particulars" field for Codebook1 field is populated by the value "Joint". This, together with possibly other information regarding Codebook1, allows the encoder to encode the binary data into a series of symbols in a single, joint constellation for the three tones of Signature1 (tones 4, 7 and 15). The joint constellation may have any suitable dimensionality, and any point in the constellation is projected onto all three tones.

Some embodiments of the present disclosure utilize an alternative modulation technique to encode binary data using multiple tones by using different tones for different subsets of bits in the input data, i.e., using the tones "independently" (and thus corresponding to a value of "Independent" in the "Constellation Particulars" field). By way of a practical comparison, 3 tones can be used to create a constellation with $2^6=64$ symbols, or three constellations with 4 points each. This would amount to encoding the data by mapping it to three distinct subsets of the tones in the signature (one tone per subset). In fact, the data can be considered to be divided into three subsets of data, each such subset being independently mapped to a corresponding sub-sequence of symbols, each symbol being represented by a distinct tone in the signature, i.e., each symbol is not "spread" over all the tones, or all the non-zero tones, in the signature. This means that, at the receiver, tone-by-tone demodulation can be used to decode the transmitted symbols, which can significantly reduce the computational cost associated with decoding received signals.

Figure 6:
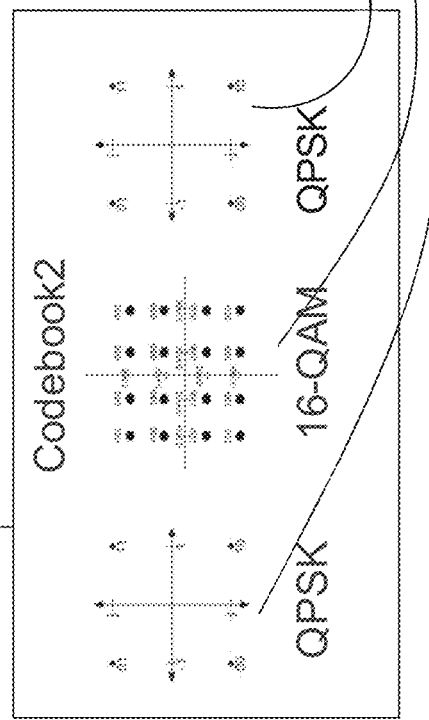
FIG. 6 shows an encoder configured to encode binary data using a subset of tones associated with a signature using independent constellations in accordance with an embodiment of the present disclosure.

FIG. 6 shows an example of an encoder configured to encode binary data using a subset of tones associated with a signature (Signature2) using independent constellations in accordance with an embodiment of the present disclosure. FIG. 6 shows binary data being received at the encoder. The encoder may have access to a database (e.g., see FIG. 2) that includes a codebook mapping that indicates that the received binary data is associated with three independent constellations (Codebook2). The encoder also knows, from the database, that the signature for Codebook2 is Signature2 (which corresponds to tones 3, 10 and 12, see FIG. 3A) and that the "Constellation Particulars" field for Codebook2 field is populated by the value "Independent". This, together with possibly other information regarding Codebook2, allows the encoder to encode the binary data into a series of symbols using three independent constellations for the three tones of Signature2 (tones 3, 10 and 12). The independent constellations may have any suitable dimensionality, and any point in each independent constellation is projected onto only one of the tones. For example, to encode 8 data bits using three tones, three two-dimensional constellations may be used, with two subsets of 2 data bits being mapped to two two-dimensional spaces (1 bit in each dimension) using two QPSK modulations and one subset of 4 data bits being mapped to a two-dimensional space (2 bits in each dimension) using 16-QAM modulation.

It should be appreciated that in the case of independent constellations, it is possible but not necessary that the same or different modulation techniques may be used to create the output symbols. For example, where there are three tones associated with three independent constellations, the three constellations may be used for the same type of modulation (e.g., QPSK, QAM, etc.) or there may be a difference in the type of modulation used for each tone (e.g., QPSK for two and 16QAM for the other one, as illustrated in the example shown in FIG. 6, etc.) or in the power level or phase rotation used for the modulation scheme on a particular tone. A complete list of possible modulation techniques is not provided here, but those skilled in the art will appreciate that any modulation technique is covered, including but not limited to PSK and QAM modulations (e.g. BPSK, QPSK, 8PSK, 16QAM, etc.).

Of course, even though the term "independent" is used in the above, this does not preclude a correlation existing amongst the symbols carried between different tones of a symbol stream. This correlation may be introduced by a forward error correcting (FEC) encoder at the transmitter/encoder. An example of this correlation can be having redundant bits between the input bit stream mapped to different tones of a symbol stream.

It should also be appreciated that when 3 or more tones are associated with a signature, it is not necessary to restrict the constellation design to "all joint" or "all independent". Indeed, N tones (where N is at least 3) can be broken up into between 2 and (N−1) more constellations in any suitable way that may occur to persons skilled in the art. Of course, when there are N constellations for N tones, then this is the case of "independent" constellation particulars described previously, and where a single constellation is designed for all N tones, this is the case of "joint" constellation particulars, also described previously.

Of course, different signatures need not all have the same number of tones. Also, some signatures may have a single tone, and other signatures may have more than one tone. For the single-tone signature(s) this would result in not being able to devise a codebook with a "joint" constellation, because there is only a single tone.

Also, the signatures need not be associated with a distinct receiver, such as a UE or a base station. For example, the binary (or M-ary) data for a receiver could be split over multiple component streams, each component stream being encoded with a different signature and/or a different codebook as described above.

It will be appreciated that in the case of a joint constellation, each tone has a certain number of "projections" that is greater than in the case of independent constellations. Thus, the flexibility to choose, for a given data stream, whether to encode that stream using a joint constellation or independent constellations has the potential advantages of better accommodating differences in payloads among different receivers because lower bandwidth receivers can be encoded using more robust encoding schemes. In particular, it will be appreciated that a joint 16-point constellation devised using 4 bits over two tones ($16=2^4$) can encode the same number of bits as two independent 4-point constellations (e.g., QPSK). An advantage of the joint constellation is the frequency diversity achieved by spreading over both tones. Also, when switching to the independent constellations, decoding complexity may be reduced, as described previously.

A method for transmitting according to an embodiment of the present disclosure includes applying FEC encoding, e.g. turbo encoding, to a stream of input bits associated with a first data layer to generate a first stream of coded bits. The first stream of coded bits is mapped to K binary streams. A layer-specific set of stream-specific modulations are applied to the K binary streams to generate K independent complex-valued symbol streams. The K independent complex-valued symbol streams are mapped to T resource elements out of N resource elements of a shared resource, the T resource elements being defined by a layer-specific signature of length N, where 1≤T≤N.

Figure 7:
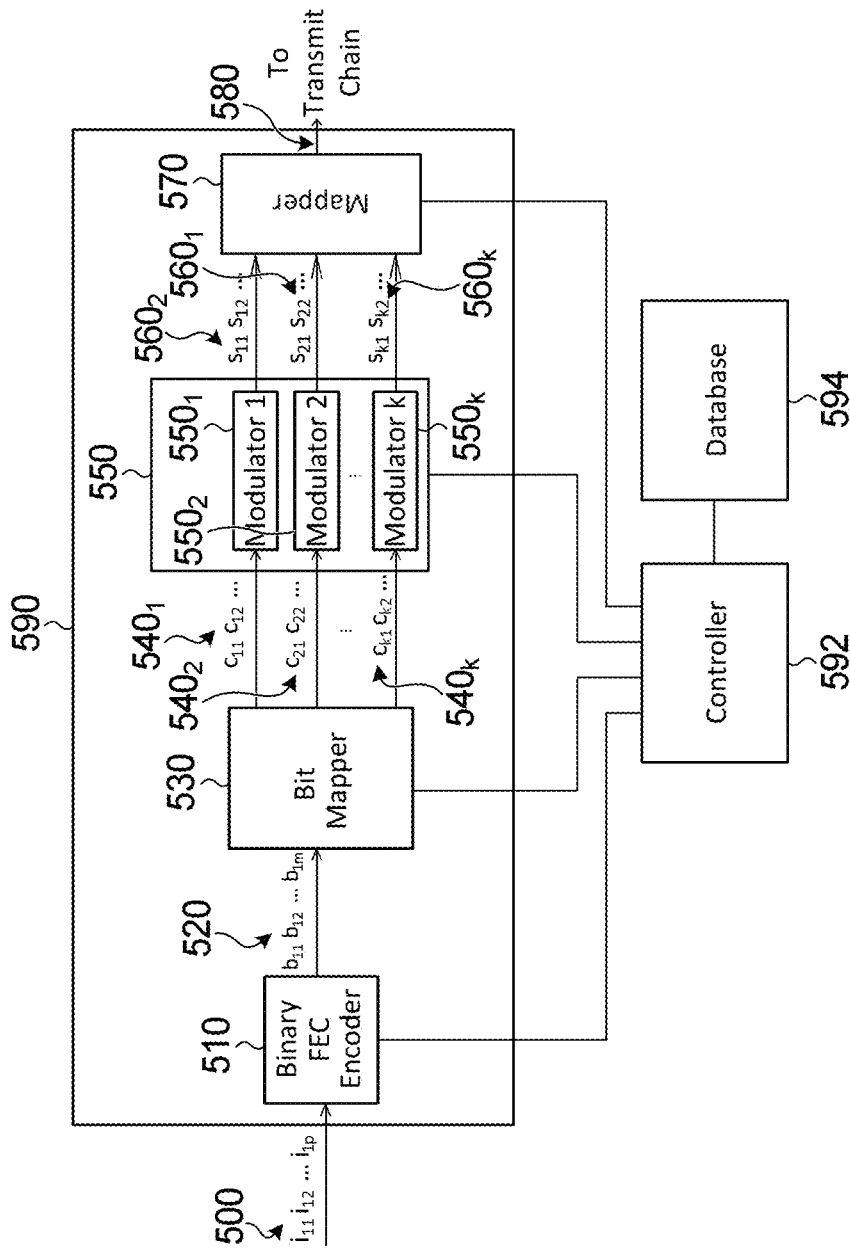
FIG. 7 is a block diagram of an apparatus implementing a bit mapping and modulating technique using different tones for different subsets of bits of input data in accordance with an embodiment of the present disclosure

Referring to FIG. 7, which is a block diagram of an apparatus implementing a signal spreading technique according to an aspect of the disclosure, an example of a general framework for an encoder 590 for encoding binary data using different tones for different subsets of bits in the input data will be described. The encoder 590 includes a binary FEC encoder 510, a bit mapper 530 coupled to the binary FEC encoder, a layer-specific set 550 of stream-specific modulators $550_1$, $550_2$ ... $550_K$ coupled to the bit mapper, and a symbol mapper 570 coupled to the modulators. The components in FIG. 7 could be implemented in circuitry that is configured to perform operations as disclosed herein. These components could be implemented using hardware, firmware, components which execute software that is stored on one or more non-transitory computer or processor readable media, examples of which are provided above, or some combination thereof. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

A bit stream or sequence 500 associated with a data layer is shown to represent the input binary bits to be transmitted to an intended receiver, such as a UE, for downlink communications. Embodiments could also or instead be implemented for uplink communications from UEs to a base station or a network node. Therefore, a UE is referenced herein as an illustrative example of a receiver. A base station, network node, or other network equipment could also or instead be an intended receiver of transmitted signals. The input bits of the bit sequence 500 are fed into a binary FEC encoder 510 to generate the stream or sequence of coded bits 520. Then, the sequence of coded bits 520 is mapped to K binary sequences $540_1$, $540_2$ ... $540_K$ using a bit mapper 530. The binary sequences $540_{1-K}$ include subsets of the coded bits 520. These subsets are determined by bit mapper 530. The subsets may be overlapping, i.e. they might have some elements in common. Bit mapper 530 also determines the order of the coded bits in each binary sequence $540_{1-K}$. The bit mapper 530 could interleave, scramble, or otherwise change the order of the coded bits 520 before they are mapped to the binary sequences $540_{1-K}$. In another embodiment, a separate bit level interleaver/scrambler could be provided and coupled between the binary FEC encoder 510 and the bit mapper 530. In other embodiments, the bit mapper 530 performs any bit-level interleaving, and a separate bit-level scrambler is coupled between the FEC encoder 510 and the bit mapper.

The binary sequences $540_{1-K}$ are mapped to K independent complex-value symbol streams $560_1$, $560_2$ ... $560_K$ using a layer-specific set 550 of stream-specific modulators $550_1$, $550_2$ ... $550_K$.

The set of complex-valued symbol streams $560_1$, $560_2$ ... $560_K$ are mapped to T resource elements, e.g., OFDM tones, of a shared resource by a symbol mapper 570 to generate the output symbols 580 to be transmitted. The symbol mapper 570 maps the K independent complex-valued symbol streams to T resource elements out of N resource elements of a shared resource, the T resource elements being defined by a layer-specific signature of length N, where 1≤T<N.

In some embodiments, a controller 592 may be configured to control the FEC encoder 510, the bit mapper 530, the set 550 of stream specific modulators $550_1$, $550_2$ ... $550_K$ and/or the symbol mapper 570. For example, controller 592 may determine the data layer associated with input bit stream 500 by checking a database 594 that includes rules, information, or criteria for configuring the foregoing components. For example, the database 594 may store layer-specific configuration information that identifies, for each of one or more layers, layer-specific signatures and layer-specific sets of stream-specific modulators to be used for transmitting data associated with the layer. For one or more of the layers, the configuration of the components may be further based on additional criteria, such as the FEC rate of the FEC encoder 510 and/or a target spectral efficiency. For example, a less sparse signature and/or higher ordered modulations may be used for a higher FEC rate and/or a higher target spectral efficiency. The layer-specific signature used to map the complex-valued symbol streams to resource elements of the shared resource, and information about the layer-specific set of stream-specific modulators, can be obtained at the receiver side by signaling the layer index and modulation and coding scheme (MCS) and/or spectral efficiency associated with the input bit stream.

In some embodiments, transmit power may be unequally assigned to the complex-valued symbol streams. In some embodiments, the transmit powers assigned to the complex-valued symbol streams may be a function of the layer index, i.e., layer-specific, and/or a function of each stream-specific modulator used to generate a particular complex-valued symbol stream, e.g., a QPSK symbol may be assigned a higher transmit power than a BPSK symbol. In some embodiments, the power assignment can also be a function of the FEC rate used to encode the input bit stream. In some embodiments, the power assignment may also be a function of the sparsity level of the signature and/or the proportion of different modulators in the set of stream-specific modulators. In some embodiments, transmit powers may be assigned to the complex-valued symbol streams using a layer-specific power scaling vector of length K.

In some embodiments, different phase rotations may be applied to the complex-valued symbol streams for better receiver performance. The different phase rotations applied to the different modulated signals may also be layer-specific. In some embodiments, the phase rotations can also be a function of the FEC rate used to encode the input bit stream. In some embodiments, the phase rotations may also be a function of the sparsity level of the signature and/or the proportion of different modulators in the set of stream-specific modulators. In some embodiments, phase rotations may be applied to the complex-valued symbol streams using a layer-specific phase rotation vector of length K.

One purpose of applying unequal transmit powers and/or phase rotations to different complex-valued symbol streams is to optimize decoding performance at a receiver when multiple layers are multiplexed together.

In one embodiment, the coded bit stream 520 includes coded bits $b_{11}b_{12}b_{13}$, and bit mapper 530 generates two streams $540_{1-2}$, including a first stream with bit $b_{11}$ and a second stream including bits $b_{12}b_{13}$. In this case, the streams are disjoint, because there is no overlap in the bits of each stream. In this example, the modulator $550_1$ could be a BPSK modulator and the modulator $550_2$ could be a QPSK modulator. It will be appreciated that 8-point SCMA codebooks can be defined by using different combinations of layer-specific sparsity patterns and configurations of the modulators $550_{1-2}$.

Figure 8:
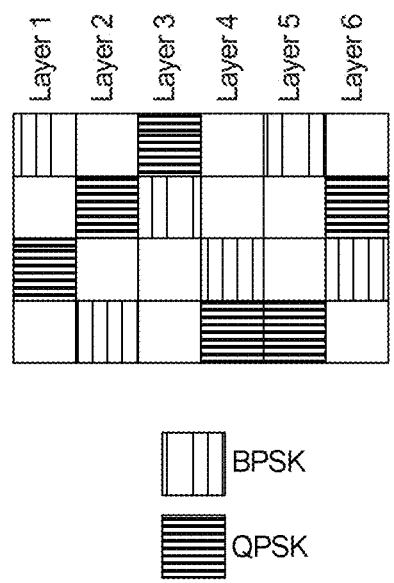
FIG. 8 shows an example of 8-point SCMA codebooks for six layers in accordance with an embodiment of the present disclosure.

FIG. 8 illustrates an example of 8-point SCMA codebooks for six layers that use the same sparsity pattern as conventional SCMA codebooks with a spreading factor (SF) of 4, i.e., T=2, N=4. Using these codebooks, independent BPSK and QPSK signals are transmitted over the non-zero tones for each layer. The sequence of BPSK and QPSK modulators across the layers is shuffled to make the collision pattern more uniform, i.e., the sequence of BPSK and QPSK modulators is layer-specific.

As noted above, in some embodiments unequal transmit powers and/or phase rotations may be assigned to the BPSK and QPSK signals for better receiver performance.

Figure 9:
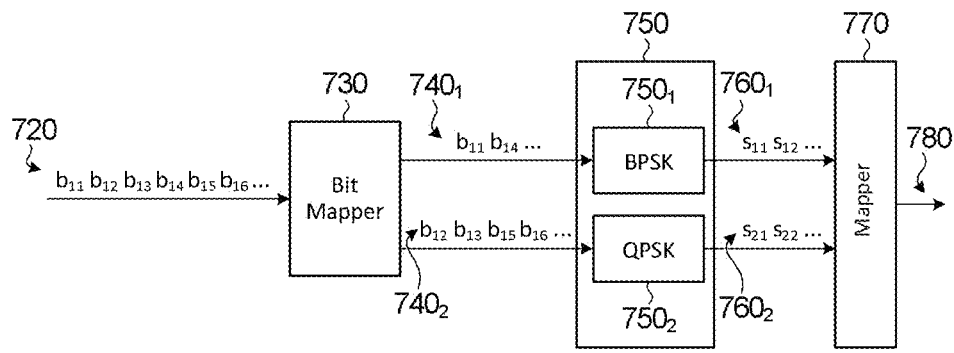
FIG. 9 is a block diagram of an apparatus implementing a bit mapping and modulation technique according to another embodiment of the present disclosure.

FIG. 9 is a block diagram of an apparatus implementing bit mapping and modulation to implement the 8-point SCMA codebook for Layer 1 shown in FIG. 8. The apparatus in FIG. 9, like the apparatus in FIG. 7, includes a bit mapper 730, a layer-specific set 750 of stream-specific modulators $750_1$, $750_2$ coupled to the bit mapper, and a symbol mapper 770 coupled to the modulators. The example implementations of components in FIG. 7 provided above also apply to the corresponding components in FIG. 9. Operation of components as described above with reference to FIG. 7 also apply to the corresponding components in FIG. 9.

In FIG. 9, the bit mapper 730 maps input bits 720 to bit streams $740_{1-2}$ such that bits $b_{11}$ and $b_{14}$ are mapped to bit stream $740_1$ and bits $b_{12}$, $b_{13}$, $b_{15}$ and $b_{16}$ are mapped to bit stream $740_2$. The layer specific set 750 of stream-specific modulators $750_1$ and $750_2$ is configured so that the first stream-specific modulator $750_1$ applies a BPSK modulation to bit stream $740_1$ to generate complex-valued symbol stream $760_1$ and the second stream-specific modulator $750_2$ applies a QPSK modulation to bit stream $740_2$ to generate complex-valued symbol stream $760_2$. As shown, the bit streams $740_{1-2}$ include segments $b_{11}$ $b_{14}$ and $b_{12}$ $b_{13}$ $b_{15}$ $b_{16}$ of different lengths, in ratios proportional to the modulation orders of the modulators $750_1$, $750_2$. Symbol mapper 770 maps the independent complex valued symbol streams to the first and third tones of the shared resource in accordance with the non-zero elements of the layer-specific signature of Layer 1 in FIG. 8. It is noted that the same configuration of bit mapper 730 and modulators $750_1$ and $750_2$ could also be used to implement Layer 4 or 5 by re-configuring symbol mapper 770 in accordance with the layer-specific signature of Layer 4 or 5.

In the example shown in FIG. 8, each of the six layers has the same sparsity level (2 non-zero elements out of 4), but different sparsity patterns, and each layer has some shuffled combination of the same two modulations, i.e., one BPSK modulation and one QPSK modulation. This means that each layer has the same spectral efficiency (SE).

Figure 10:
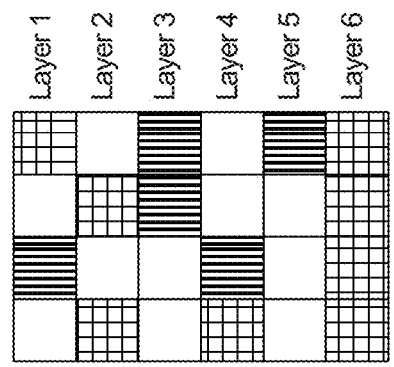
FIG. 10 shows an example of codebooks for six layers in which different layers have different target spectral efficiencies according to another embodiment of the present disclosure.
Figure 10:
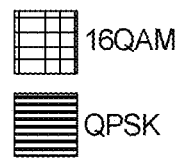

FIG. 10 illustrates an example of codebooks for six layers in which different layers have different target spectral efficiencies. The different spectral efficiency is a result of utilizing a different sparsity level and/or a different set of stream-specific modulations. In this example, Layer 5 has very low target SE, so it is assigned only one non-zero tone and a low QAM level (QPSK). Layer 3 has low target SE, so it is assigned two non-zero tones and a low QAM level (QPSK). Layers 1 and 4 have a medium target SE, so they are assigned two non-zero tones with combinations of QPSK and 16-QAM, however, the sequence of the two modulations is different in Layers 1 and 4. Layer 2 has a high target SE, so it is assigned two non-zero tones with high QAM (16-QAM). Layer 6 has a very high target SE, so it is assigned all resource elements (no sparsity) with high QAM (16-QAM). In some embodiments there may be an unequal power assignment to different modulation signals and/or different phase rotations may be applied to different modulation signals for better receiver performance.

Figure 11:
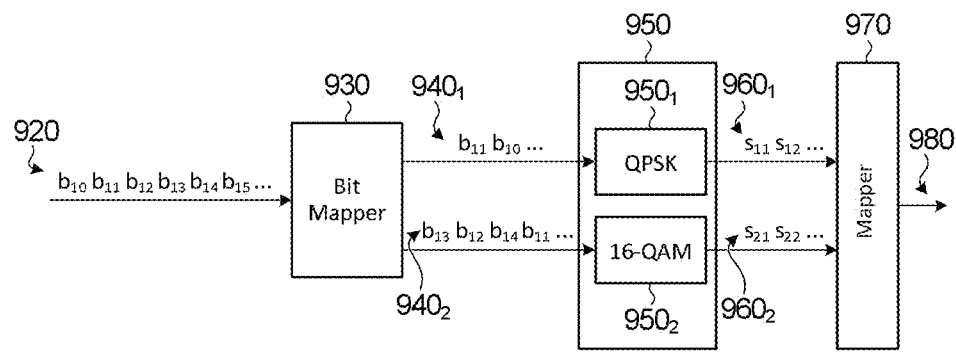
FIG. 11 is a block diagram of an apparatus implementing a bit mapping and modulation technique according to another embodiment of the present disclosure.

FIG. 11 is a block diagram of an apparatus implementing bit mapping and modulation to implement the codebook for Layer 4 shown in FIG. 10. The apparatus in FIG. 11, like the apparatus in FIG. 7, includes a bit mapper 930, a layer-specific set 950 of stream-specific modulators $950_1$, $950_2$ coupled to the bit mapper, and a symbol mapper 970 coupled to the modulators. The example implementations of components in FIG. 7 provided above also apply to the corresponding components in FIG. 11. Operation of components as described above with reference to FIG. 7 also apply to the corresponding components in FIG. 11.

In FIG. 11, the bit mapper 930 maps input bits 920 to bit streams $940_{1-2}$ such that bits $b_{11}$ and $b_{10}$ are mapped to bit stream $940_1$ and bits $b_{13}$, $b_{12}$, $b_{14}$ and $b_{11}$ are mapped to bit stream $940_2$. The layer specific set 950 of stream-specific modulators $950_1$ and $950_2$ is configured so that the first stream-specific modulator $950_1$ applies a QPSK modulation to bit stream $940_1$ to generate complex-valued symbol stream $960_1$ and the second stream-specific modulator $950_2$ applies a 16-QAM modulation to bit stream $940_2$ to generate complex-valued symbol stream $960_2$. Here again, the bit streams $940_{1-2}$ include segments $b_{11}$ $b_{10}$ and $b_{13}$ $b_{12}$ $b_{14}$ $b_{11}$ of different lengths, in ratios proportional to the modulation orders of the modulators $950_1$, $950_2$. Symbol mapper 970 maps the independent complex valued symbol streams to the third and fourth tones of the shared resource in accordance with the non-zero elements of the layer-specific signature of Layer 4 in FIG. 10.

It is noted that in FIG. 11, the bit mapper 930 maps input bits 920 to bit streams $940_{1-2}$ such that bit $b_{11}$ is common to both bit streams, and bits $b_{13}$, $b_{12}$, $b_{14}$ and $b_{10}$ are disjoint between the bit streams. As such, the bit mapper 930 provides signal spreading, in that bit $b_{11}$ is spread over two tones.

Although FIGS. 9 and 11 illustrate only a bit mapper, modulators coupled to the bit mapper and a symbol mapper coupled to the modulators, other components such as a binary FEC encoder, a bit-level interleaver/scrambler, for example, could be provided in other embodiments.

Figure 12:
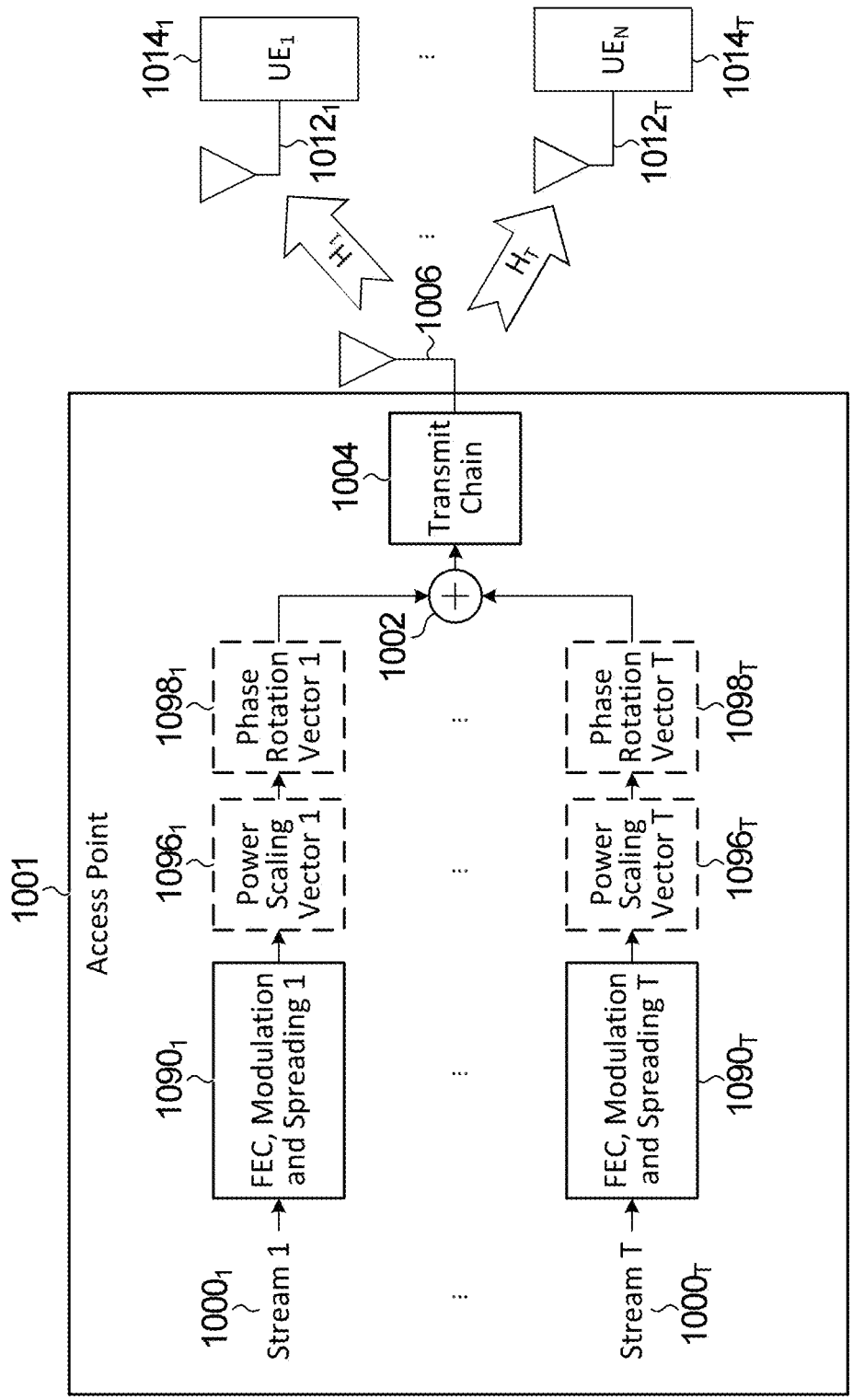
FIG. 12 is a block diagram of a bit mapping, modulation and multi-user signal multiplexing technique according to another aspect of the disclosure.

Referring now to FIG. 12, which is a block diagram of a signal spreading and multi-user signal multiplexing apparatus according to another aspect of the disclosure, an example of signal spreading and transmission multiplexing for downlink transmission will be discussed. In access point 1001, T layer-specific input bit streams $1000_1$ . . . $1000_T$ are first fed into the blocks $1090_1$ . . . $1090_T$ representing binary FEC, modulation, and spreading (using layer-specific bit mapping, modulation and symbol mapping as described above). Then, each stream of output symbols may optionally be fed into layer-specific power scalers $1096_{1-T}$, which apply power scaling vectors to scale the input symbols using a real-valued vector to generate power-scaled symbols. Each stream of symbols may optionally be fed into layer-specific phase rotators $1098_{1-T}$, which apply phase rotation vectors to apply phase rotations to the power-scaled symbols to generate power-scaled and phase-rotated symbols. The power-scaled and phase-rotated symbols are added together by adder 1002 and generate a multiplexed symbol stream, which is transmitted by transmit chain 1004 through antenna 1006 for reception by UEs $1014_{1-T}$ through antennas $1012_{1-T}$. The example implementations of components in FIG. 7 provided above also apply to the components in FIG. 12. Such implementations could also be applied to the UEs $1014_{1-T}$. The antennas 1006, $1012_{1-T}$ could include one or more physical antenna elements of any of various types, together with appropriate transmit circuitry or modules at the access point 1001 and at least appropriate receive circuitry or modules at the UEs $1014_{1-T}$.

Figure 13:
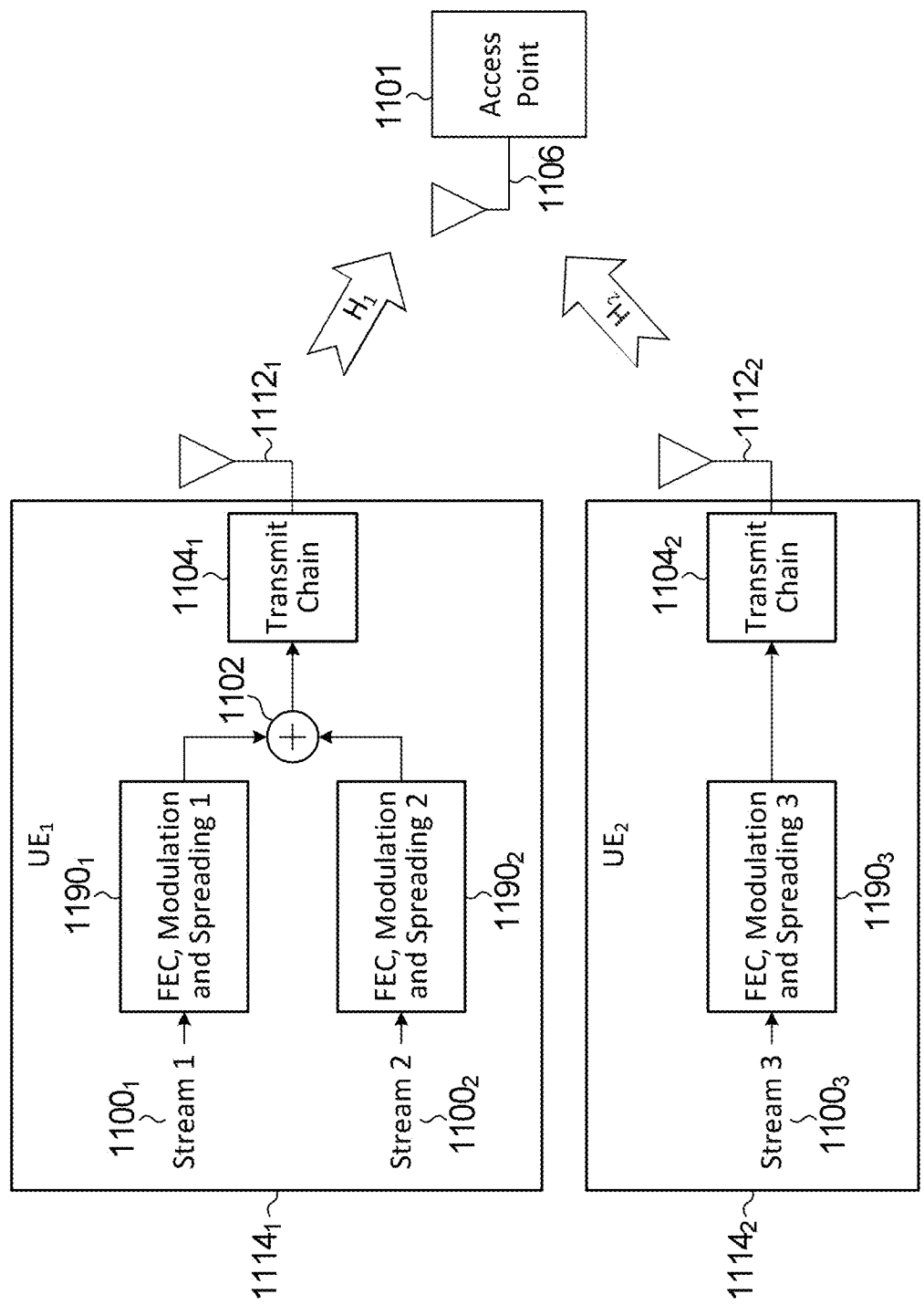
FIG. 13 is a block diagram of a bit mapping and modulation technique for uplink transmission in accordance with an embodiment of the present disclosure.

Referring now to FIG. 13, which is a block diagram of a signal spreading apparatus according to another aspect of the disclosure, an example of signal spreading and transmission for uplink transmission will be discussed. This example includes two UEs $1114_1$ and $1114_2$ with uplink transmissions to an access point 1101. As noted above, in some embodiments a UE may be assigned more than one layer. For illustrative purposes, in this example the first UE $1114_1$ is assigned two layers and transmits two data streams to the access point 1101. The second UE $1114_2$ is assigned only one layer and transmits one data stream to the access point 1101. In the first UE $1114_1$, two layer-specific input bit streams $1100_1$ and $1100_2$ are first fed into the blocks $1190_1$ and $1190_2$ representing binary FEC, modulation, and spreading (using layer-specific bit mapping, modulation and symbol mapping as described above). The streams of output symbols from the blocks $1190_1$ and $1190_2$ are added together by adder 1102 and generate a multiplexed symbol stream which is transmitted by transmit chain $1104_1$ through antenna 1106 for reception by access point 1101 through antenna 1106. In the second UE $1114_1$, a single layer-specific input bit stream $1100_3$ is first fed into the blocks $1190_3$ representing binary FEC, modulation, and spreading (using layer-specific bit mapping, modulation and symbol mapping as described above). The stream of output symbols from the blocks $1190_3$ is transmitted by transmit chain $1104_2$ through antenna $1112_2$ for reception by access point 1101 through antenna 1106. The example implementations of components in FIG. 7 provided above also apply to the components in FIG. 13. The antennas 1106, $1112_{1-2}$ could include one or more physical antenna elements of any of various types, together with appropriate transmit circuitry or modules at the UEs $1114_{1-2}$ and at least appropriate receive circuitry or modules at the access point 1101.

Figure 14:
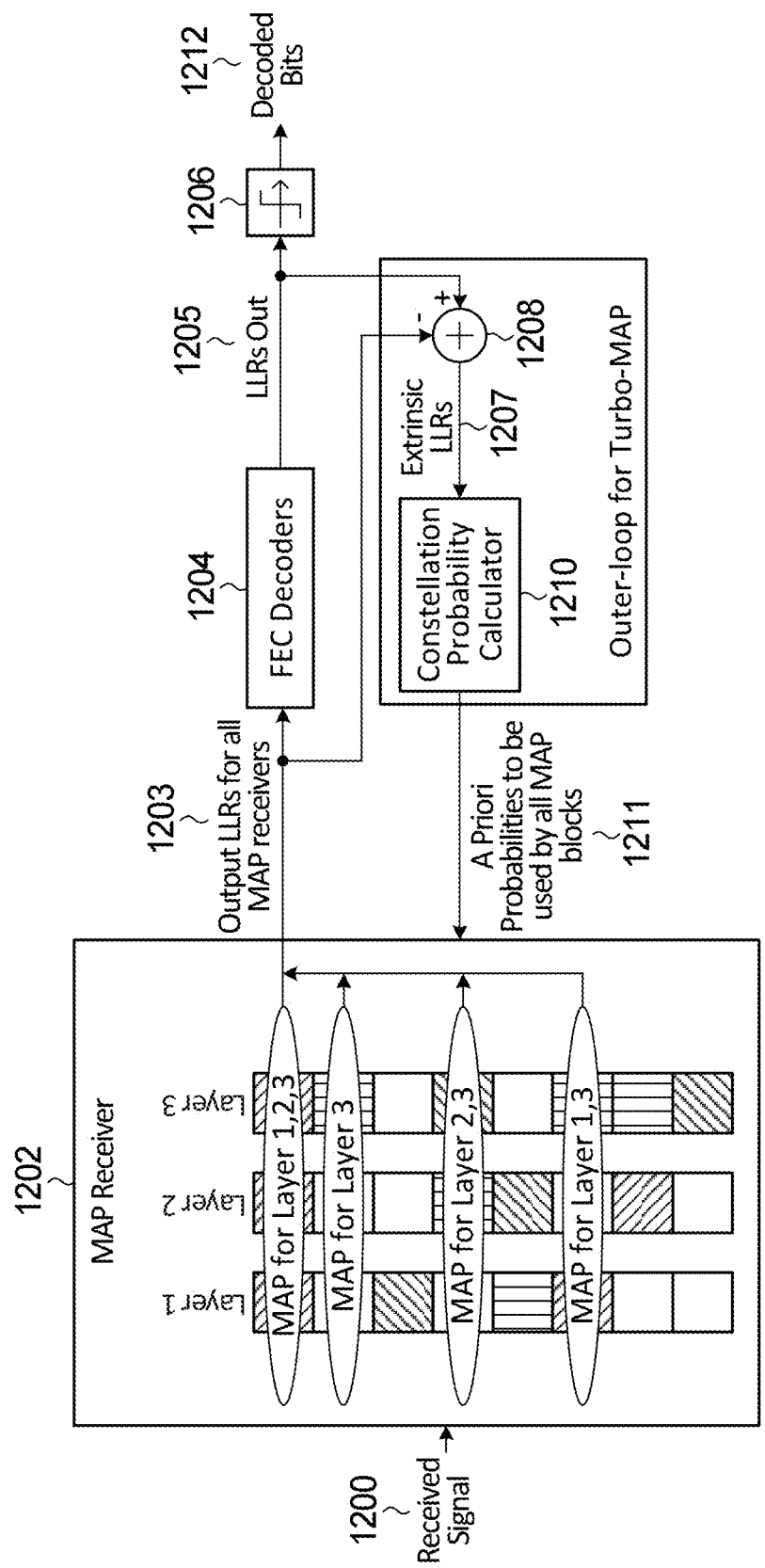
FIG. 14 is a block diagram of a receiver apparatus according to another embodiment of the present disclosure.

Referring to FIG. 14, which is a block diagram of a receiver apparatus according to another aspect of the disclosure, an example of a receiver to decode data streams corresponding to a plurality of transmitters will be described. Such a receiver may be used to decode uplink data streams corresponding to a plurality of UEs in an access point, for example. The example apparatus includes a maximum a posteriori prediction (MAP) receiver 1202, binary FEC decoders 1204 having inputs coupled to outputs of the MAP receiver, a quantizer 1206 having inputs coupled to outputs of the FEC decoders, a subtractor 1208 having a first set of inputs coupled to the outputs of the FEC decoders and a second set of inputs coupled to the outputs of the MAP receiver, a constellation probability calculator having inputs coupled to outputs of the constellation probability calculator and outputs coupled to inputs of the MAP receiver. The components in FIG. 14 could be implemented in circuitry that is configured to perform operations as disclosed herein, and examples are described above.

A received signal 1200 is fed into the MAP receiver 1202. In this example, the received signal 1200 includes three layer-specific sets of independent complex-valued symbols streams transmitted using three layer-specific sets of resource elements. The MAP receiver 1202 applies a tone-by-tone MAP algorithm to the received signal to generate coded bit log likelihood ratios (LLRs) 1203. The coded bit LLRs are fed to the FEC decoders 1204 to generate decoded bit LLRs 1205. Quantizer 1206 determines streams of input bits 1212 based on the decoded bit LLRs 1205 from FEC decoders 1204. Subtractor 1208 is used to calculate extrinsic LLRs 1207 by subtracting the input bit LLRs 1203 from the output bit LLRs 1205. Constellation probability calculator 1210 calculates, based on the extrinsic LLRs 1207, a priori probabilities for the MAP decoders of the MAP receiver 1202 to use for the next iteration of the MAP algorithm.

For each tone, the MAP receiver 1202 uses knowledge of the active layers on the tone and their corresponding modulation level (and power and phase rotations, if applicable) in applying the MAP algorithm.

In the example shown in FIG. 14, the MAP algorithm is applied across all of the active layers on a given tone. In some embodiments, a successive interference cancellation (SIC) strategy is used, in which the MAP algorithm is applied over only a subset of the active layers, treating other layers as interference. In one embodiment, tone-based selection is used to select the subset of active layers for each resource element. In tone-based selection, at each tone a subset of the active layers is selected based on the signal to interference plus noise ratio (SINR) or data throughput capacity of the active layers. For example, the MAP algorithm may be applied over only the subset of active layers with the highest SINR on a particular tone (e.g., out of three active layers on a given tone, the MAP algorithm may be applied over only the two active layers with the highest SINR). In another embodiment, layer-based selection is used to select the subset of active layers for each resource element. In layer-based selection, the subset of active layers for all tones is selected based on average SINR or average normalized capacity of the active layers over the resource elements.

Figure 15B:
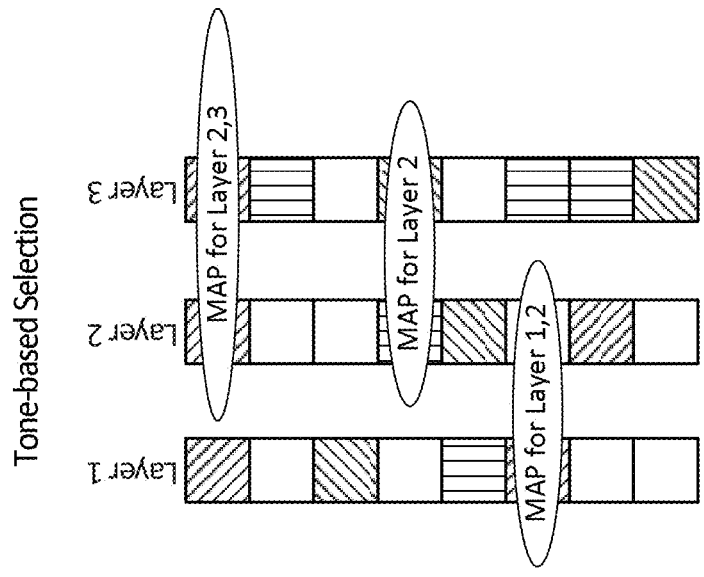
FIG. 15B shows an example of tone-based selection of layers for a maximum a posteriori prediction (MAP) receiver according to another aspect of the present disclosure.
Figure 15A:
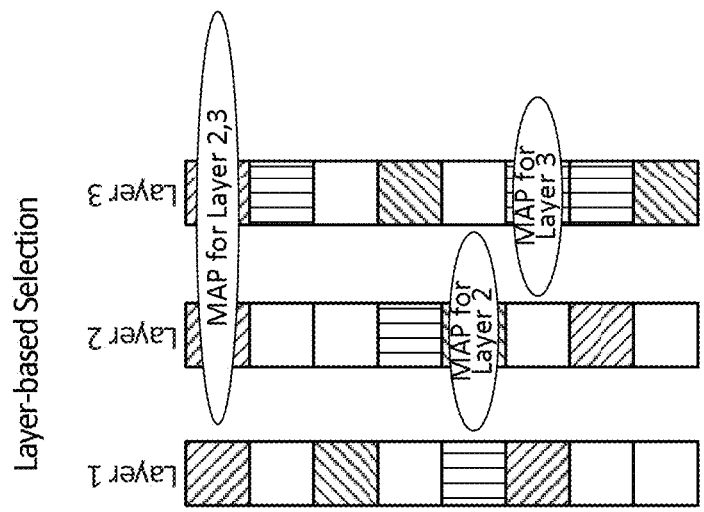
FIG. 15A shows an example of layer-based selection of layers for a maximum a posteriori prediction (MAP) receiver according to another aspect of the present disclosure.

FIGS. 15A and 15B depict examples of the application of layer-based and tone-based selection, respectively. As shown in FIG. 15A, the MAP algorithm is applied only over the active elements of layers 2 and 3 on each tone, treating the elements of layer 1 as interference. In contrast, in FIG. 15B, a respective subset of active layers is selected on each tone individually, e.g., on the first tone the MAP algorithm is applied over the active elements of layers 2 and 3, treating the active element of layer 1 as interference, whereas on the sixth tone the MAP algorithm is applied over the active elements of layers 1 and 2, treating the active element of layer 3 as interference. In general, the number of layers considered for MAP may depend on a complexity constraint of the receiver and/or the modulation order of the layers.

Figure 16:
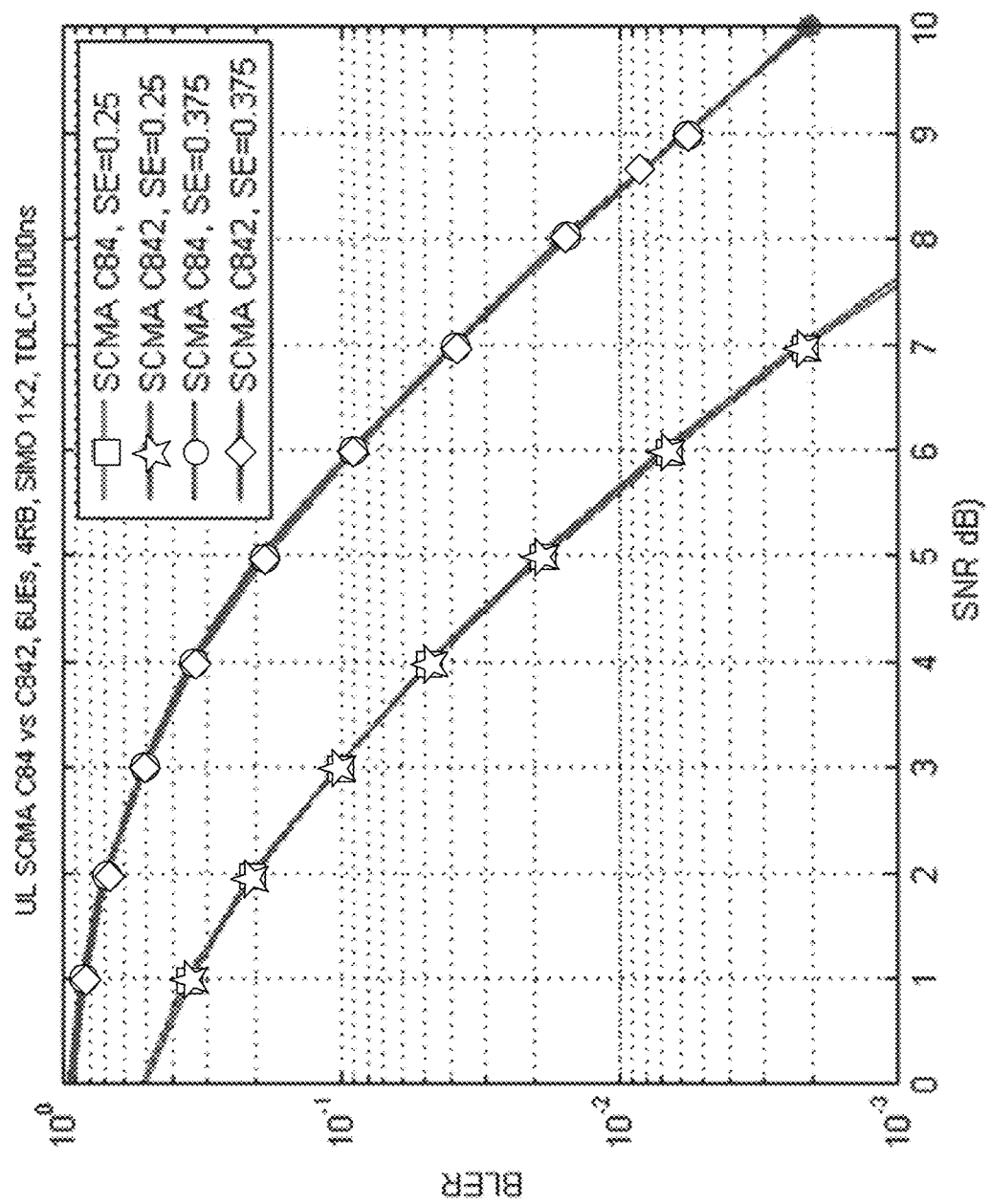
FIG. 16 is a plot of simulation results for uplink transmission block error rate (BLER) vs. signal to noise ratio (SNR) for an embodiment of the present invention.

Simulation results are now presented with reference to FIG. 16. FIG. 16 is a plot of simulation results for uplink (UL) block error rate (BLER) vs. signal to noise ratio (SNR) for an embodiment of the present disclosure (identified as SCMA 842) compared to conventional SCMA (identified as SCMA 84) for two different spectral efficiencies (0.25 and 0.375) with no UE or receiver (Rx) correlation.

As shown in FIG. 16, the new SCMA solution according to an embodiment of the present disclosure provides comparable performance to the conventional SCMA codebook with less decoding complexity.

Figure 17A:
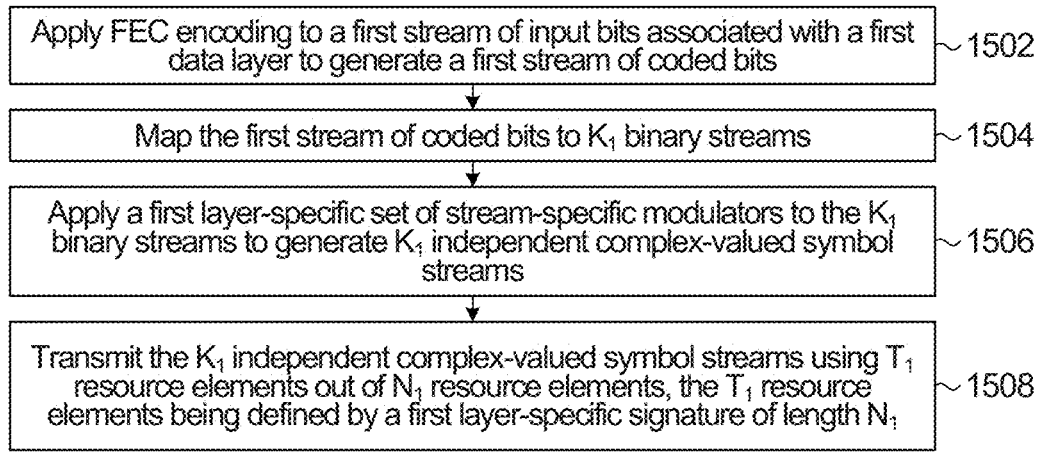
FIG. 17A is a flow diagram of example operations in a transmitter according to an embodiment.

Various embodiments are described by way of example above. FIG. 17A is a flow diagram of example operations in a transmitter according to an embodiment of the present disclosure.

At 1502, the transmitter applies forward error correction (FEC) encoding to a first stream of input bits associated with a first data layer to generate a first stream of coded bits. At 1504, the transmitter maps the first stream of coded bits to $K_1$ binary streams. As also described elsewhere herein, the mapping could include interleaving and/or scrambling of the stream of coded bits. In other embodiments, either or both of interleaving and scrambling could be provided separately from the mapping. At 1506, the transmitter applies a first layer-specific set of stream-specific modulators to the $K_1$ binary streams to generate $K_1$ independent complex-valued symbol streams. At 1508, the transmitter transmits the symbol streams using $T_1$ resource elements out of $N_1$ resource elements. The $T_1$ resource elements being defined by a first layer-specific signature of length $N_1$, where $1 \leq T_1 < N_1$.

Other variations of the example operations could include performing the illustrated operations in any of various ways and/or performing additional or fewer operations.

For example, the first layer-specific signature and/or the first layer-specific set of stream-specific modulators could be selected based at least in part on at least one communication parameter associated with the stream of input bits. The communication parameter could be a layer index associated with the first data layer, a coding rate of the FEC encoding applied to the first stream of input bits and/or a target spectral efficiency, for example.

In some embodiments, the resource elements could be OFDM tones.

The stream-specific modulators that are applied at 1506 could be applied by QAM mappers.

In some embodiments, the mapping at 1504 could involve mapping the first stream of coded bits such that at least one coded bit is mapped to more than one of the $K_1$ binary streams and none of the $K_1$ binary streams are identical to each other. In other embodiments, the mapping at 1504 involves mapping the first stream of coded bits involves dividing the first stream of coded bits to $K_1$ disjoint binary streams.

The operations could also involve assigning stream-specific transmit powers and/or stream-specific phase rotations to the $K_1$ independent complex-valued symbol streams prior to transmission at 1508. In some embodiments, there could be an unequal power assignment between at least some of the $K_1$ independent complex-valued symbol streams. For example, at least one independent complex-valued symbol stream generated using a relatively higher-ordered stream-specific modulator could be assigned a higher transmit power than at least one independent complex-valued symbol stream generated using a relatively lower-ordered stream-specific modulator.

In some embodiments, the FEC encoding at 1502 could further involve applying FEC encoding to a second stream of input bits associated with a second data layer to generate a second stream of coded bits. Similarly, the mapping at 1504 could further involve mapping the second stream of coded bits to $K_2$ binary streams, a second layer-specific set of stream-specific modulators could be applied to the $K_2$ binary streams at 1506, to generate $K_2$ independent complex-valued symbol streams, and the $K_2$ independent complex-valued symbol streams could be transmitted at 1508 using $T_2$ resource elements out of $N_2$ resource elements. The $T_2$ resource elements may be defined by a second layer-specific signature of length $N_2$, where $1 \leq T_2 \leq N_2$. The first and second layer-specific signatures could differ in at least one of sparsity pattern and sparsity level. $K_1$ could be the same or different than $K_2$. Similarly, $N_1$ could be the same or different than $N_2$. In some embodiments, wherein the first and second symbol streams are transmitted from the same transmitter, they are multiplexed together by adding the symbols over overlapped tones. In some embodiments, the first and second layer-specific sets of stream-specific modulators differ in at least one of a sequence of the stream-specific modulators in each set and a proportion of different stream-specific modulators in each set. In some embodiments, layer-specific transmit powers and/or layer-specific phase rotations are applied to the independent complex-valued symbol streams prior to transmission at 1508. For example, in one embodiment a first layer-specific set of stream-specific transmit powers is applied to the $K_1$ independent complex-valued symbol streams, and a second layer-specific set of stream-specific transmit powers is applied to the $K_2$ independent complex-valued symbol streams.

Figure 17B:
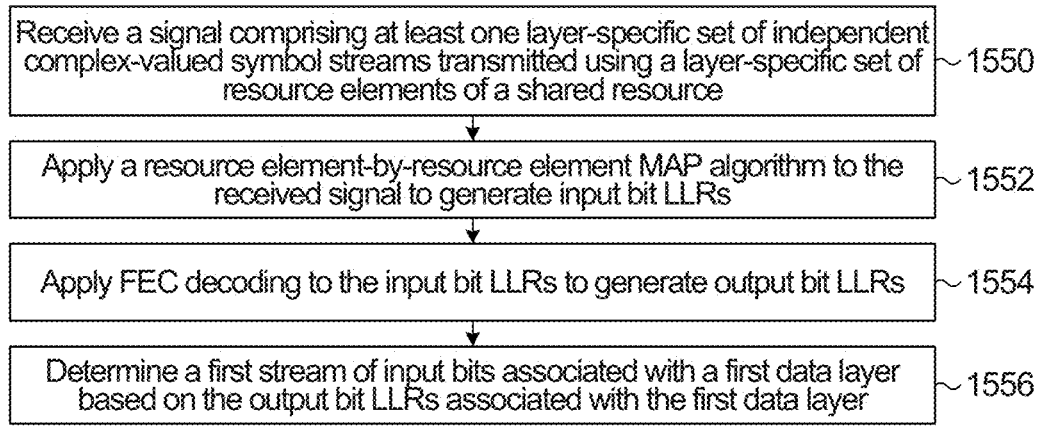
FIG. 17B is a flow diagram of example operations in a receiver according to an embodiment.

Example receiver/decoder-side operations are shown by way of example in FIG. 17B. At 1550, a receiver receives a signal that includes at least one layer-specific set of independent complex-valued symbol streams transmitted using a layer-specific set of resource elements of a shared resource is received. At 1552, the receiver applies a resource element-by-resource element MAP algorithm to the received signal to generate input bit LLRs. The input bit LLRs are fed to FEC decoders at 1554 to generate output bit LLRs. In some embodiments, the MAP algorithm applied at 1552 involves calculating extrinsic LLRs based on the output bit LLRs and the input bit LLRs, and calculating, based on the extrinsic LLRs, a priori probabilities for a next iteration of the MAP algorithm. At 1556, a first stream of input bits associated with a first data layer is determined based on the output bit LLRs from the FEC decoder associated with the first data layer. The MAP algorithm used at 1552 is one illustrative example of an estimation algorithm that may be used in an embodiment of the present disclosure. In other embodiments, other estimation algorithms, such as a linear Minimum Means Square Error (MMSE) algorithm, may be used.

In some embodiments, applying the resource element-by-resource element MAP algorithm at 1552 involves, for each resource element, applying the MAP algorithm over only a subset of active layers, treating other layers as interference. For example, resource element-based selection is used in some embodiment to select the subset of active layers for each resource element. The resource element-based selection may be based on the SINR of the active layers, for example. In other embodiments, layer-based selection is used to select the subset of active layers for all resource elements. For example, in layer-based selection the subset of active layers may be selected based on average SINR or average normalized capacity of the active layers over the resource elements. In some embodiments, the number of active layers in the subset of active layers over which the MAP algorithm is applied is selected based on a complexity constraint of a receiver and/or an order of stream-specific modulators used to generate layer-specific sets of independent complex-valued symbol streams.

Figure 18:
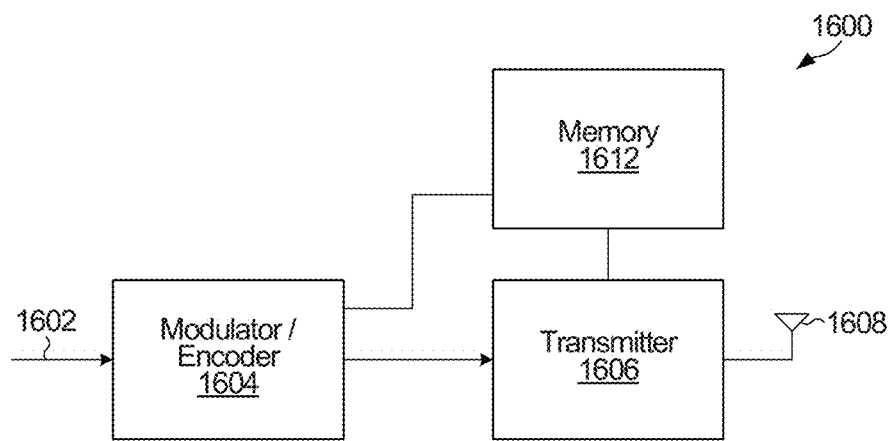
FIG. 18 is a block diagram of an example apparatus in which embodiments could be implemented.

FIG. 18 is a block diagram of an example apparatus in which embodiments could be implemented. The apparatus 1600 includes a modulator/encoder 1604 coupled to an input 1602. The apparatus 1600 also includes a transmitter 1606 coupled to the parity modulator/encoder 1604. In the illustrated embodiment, the apparatus 1600 also includes an antenna 1608, coupled to a transmitter 1606, for transmitting signals over a wireless channel. In some embodiments, the transmitter 1606 includes components of an RF transmit chain. A memory 1612 is also shown in FIG. 18, coupled to the modulator/encoder 1604 and to the transmitter 1606.

In an embodiment, the modulator/encoder 1604 is implemented in circuitry, such as a processor, that is configured to implement features as disclosed herein. The modulator/encoder 1604 could include components as shown in any of FIGS. 7, 9, 11, 12, 13, for example. In a processor-based implementation of the modulator/encoder 1604, processor-executable instructions to configure a processor to perform operations disclosed herein are stored in a non-transitory processor-readable medium. The non-transitory medium could include, in the memory 1612 for example, one or more solid-state memory devices and/or memory devices with movable and possibly removable storage media.

An apparatus could therefore include a processor, and a memory such as 1612 coupled to the processor, storing instructions which, when executed by the processor, cause the processor to perform a method as disclosed herein.

FIG. 18 generalizes an apparatus that includes a binary FEC encoder to apply FEC encoding to a first stream of input bits associated with a first data layer to generate a first stream of coded bits; a bit mapper, operatively coupled to the binary FEC encoder, to map the first stream of coded bits to $K_1$ binary streams; a first layer-specific set of stream-specific modulators, coupled to the bit mapper, to generate $K_1$ independent complex-valued symbol streams based on the $K_1$ binary streams; and a transmitter, operatively coupled to the first layer-specific set of stream-specific modulators, to transmit the $K_1$ independent complex-valued symbol streams using $T_1$ resource elements out of $N_1$ resource elements, the $T_1$ resource elements being defined by a first layer-specific signature of length $N_1$, where $1 \le T_1 < N_1$. These components represent one example implementation of the modulator/encoder 1604 and transmitter 1606.

A bit mapper could be configured to interleave and/or scramble the stream of coded bits. In other embodiments, either or both of interleaving and scrambling could be implemented separately from a bit mapper, in a bit-level interleaver/scrambler, for example.

Any of the variations described above with reference to encoding, modulation, transmission, and/or related features in FIG. 17A or 17B could be applied in an apparatus implementation. For example, the binary streams into which coded bits are mapped by a bit mapper could, but might not necessarily be, disjoint. The bit mapper could be configured to divide the coded bits among the binary streams.

In some embodiments, the modulator/encoder 1604 could include a controller to configure the bit mapper and the first layer-specific set of stream-specific modulators based at least in part on at least one communication parameter associated with the stream of input bits. The communication parameter(s) could include a layer index associated with the first data layer, a coding rate of the FEC encoding applied to the first stream of input bits and/or a target spectral efficiency, for example.

The modulator/encoder 1604 could include a plurality of stream-specific QAM mappers, to apply QAM mapping with Gray or non-Gray labeling. The steam-specific QAM mappers could be of different orders.

The modulator/encoder 1604 could include a power scaler, operatively coupled between the stream-specific modulators and the transmitter 1606, to assign stream-specific transmit powers to the $K_1$ independent complex-valued symbol streams prior to transmission. The power scaler may assign transmit powers unequally between at least some of the $K_1$ independent complex-valued symbol streams. For example, the power scaler may assign transmit powers such that at least one independent complex-valued symbol stream generated using a relatively higher-ordered stream-specific modulator is assigned a higher transmit power than at least one independent complex-valued symbol stream generated using a relatively lower-ordered stream-specific modulator.

The modulator/encoder 1604 could include a phase rotator, operatively coupled between the stream-specific modulators and the transmitter 1606, to assign stream-specific phase rotations to the $K_1$ independent complex-valued symbol streams prior to transmission.

In some embodiments, the modulator/encoder 1604 could include a second FEC encoder to apply FEC encoding to a second stream of input bits associated with a second data layer to generate a second stream of coded bits, a second bit mapper, operatively coupled to the second FEC encoder, to map the second stream of coded bits to $K_2$ binary streams, and a second layer-specific set of stream-specific modulators, operatively coupled between the second bit mapper and the transmitter, to generate $K_2$ independent complex-valued symbol streams based on the $K_2$ binary streams. In such embodiments, the transmitter 1606 could transmit the $K_2$ independent complex-valued symbol streams using $T_2$ resource elements out of $N_2$ resource elements, the $T_2$ resource elements being defined by a second layer-specific signature of length $N_2$, where $1 \le T_2 \le N_2$. The first and second layer-specific signatures could differ in at least one of sparsity pattern and sparsity level. The first and second layer-specific sets of stream-specific modulators differ in terms of the sequence of the stream-specific modulators in each set and/or the proportion of different stream-specific modulators in each set.

In some embodiments, the modulator/encoder 1604 includes first and second power scalers to assign first and second layer-specific vectors of stream-specific transmit powers to the $K_1$ and $K_2$ independent complex-valued symbol streams, respectively, prior to transmission.

In some embodiments, the modulator/encoder 1604 includes first and second phase rotators to assign first and second layer-specific vectors of stream-specific phase rotations to the $K_1$ and $K_2$ independent complex-valued symbol streams, respectively, prior to transmission.

Figure 19:
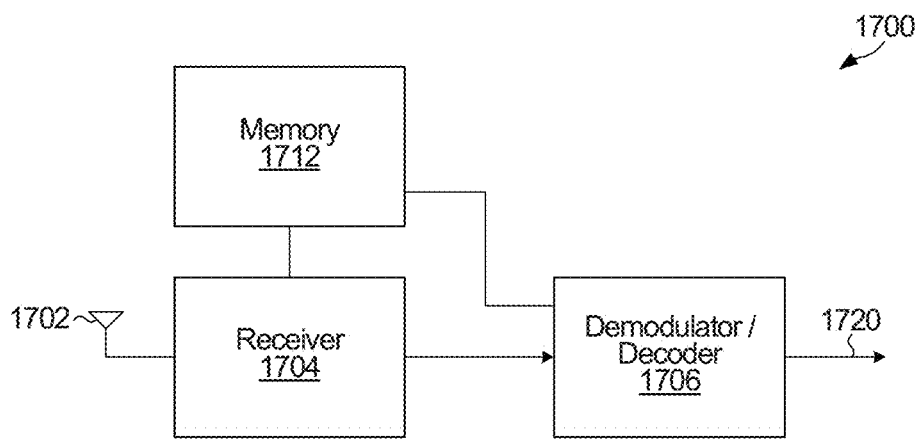
FIG. 19 is a block diagram of another example apparatus in which embodiments could be implemented.

FIG. 19 is a block diagram of another example apparatus in which embodiments could be implemented. The apparatus 1700 includes a receiver 1704 coupled to an antenna 1702 for receiving signals from a wireless channel, and to a demodulator/decoder 1706. A memory 1712 is also shown in FIG. 19, coupled to receiver 1704 and to the demodulator/decoder 1714.

In some embodiments, the receiver 1704 includes components of an RF receive chain. The receiver 1704 receives, via the antenna 1702, signals that include data streams that are to be decoded. The demodulator/decoder 1706 is configured to implement receiver decoder-side features as disclosed herein. Decoded bits are output at 1720 for further receiver processing.

In some embodiments, the apparatus 1700, and similarly the apparatus 1600 in FIG. 18 as noted above, include a non-transitory computer readable medium at 1612, 1712 that includes instructions for execution by a processor to implement and/or control operation of the modulator/encoder 1604 in FIG. 18, to implement and/or control operation of the and the demodulator/decoder 1706 in FIG. 19, and/or to otherwise control the execution of methods described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a compact disc read-only memory (CD-ROM), universal serial bus (USB) flash disk, or a removable hard disk, at 1612, 1712.

In an embodiment, the demodulator/decoder 1706 is implemented in circuitry that is configured to implement features as disclosed herein. The demodulator/decoder 1706 could include components as shown in FIG. 14, for example. The receiver 1704 and/or the demodulator/decoder 1706 could be fully or partially implemented in software or modules stored in the memory 1712 and executed by a processor(s) of the apparatus 1700.

An apparatus could therefore include a processor, and a memory such as 1712 coupled to the processor, storing instructions which, when executed by the processor, cause the processor to perform a method as disclosed herein, or receiving/decoding operations corresponding to transmitting/encoding operations disclosed herein.

Communication equipment could include the apparatus 1600, the apparatus 1700, or both a transmitter and a receiver and both a modulator/encoder and a demodulator/decoder. Such communication equipment could be user equipment or communication network equipment.

FIG. 19 generalizes an apparatus that includes a receiver configured to apply a resource element-by-resource element MAP algorithm to a received signal to generate coded bit LLRs, the received signal comprising at least one layer-specific set of independent complex-valued symbol streams transmitted using a layer-specific set of resource elements of a shared resource; a set of forward error correction (FEC) decoders, operatively coupled to the receiver, to generate decoded bit LLRs based on the coded bit LLRs; and a quantizer, operatively coupled to the set of FEC decoders, to determine a first stream of input bits associated with a first data layer based on the decoded bit LLRs from the FEC decoder associated with the first data layer. These components represent one example implementation of the receiver 1704 and demodulator/decoder 1706.

Figure 20:
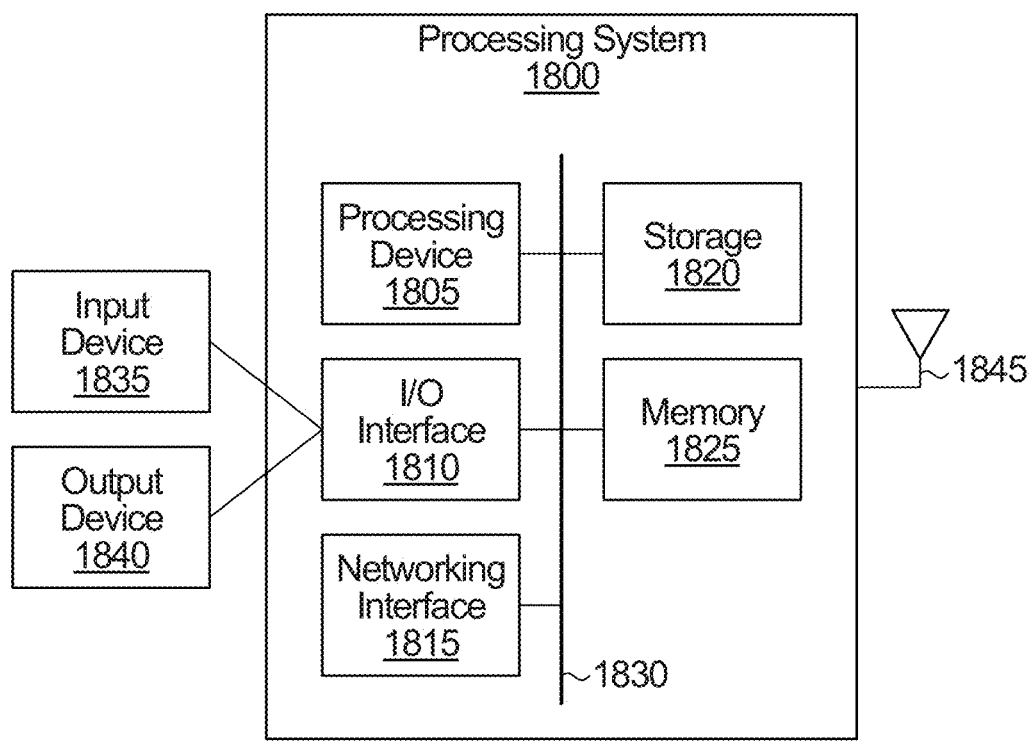
FIG. 20 is a block diagram of an example processing system, which may be used to implement embodiments disclosed herein.

FIGS. 18 and 19 are generalized block diagrams of apparatus that could be used to implement embodiments disclosed herein. FIG. 20 is a block diagram of an example processing system, which may be used to implement embodiments disclosed herein.

The apparatus 1600, the apparatus 1700, or both, may be implemented using the example processing system 1800, or variations of the processing system 1800. The processing system 1800 could be a server or a mobile device, for example, or any suitable processing system. Other processing systems suitable for implementing embodiments described in the present disclosure may be used, which may include components different from those discussed below. Although FIG. 20 shows a single instance of each component, there may be multiple instances of each component in the processing system 1800.

The processing system 1800 may include one or more processing devices 1805, such as a processor, a microprocessor, an application-specific integrated circuit (ASIC), a field-programmable gate array (FPGA), a dedicated logic circuitry, or combinations thereof. The processing system 1800 may also include one or more input/output (I/O) interfaces 1810, which may enable interfacing with one or more appropriate input devices 1835 and/or output devices 1840. The processing system 1800 may include one or more network interfaces 1815 for wired or wireless communication with a network (e.g., an intranet, the Internet, a P2P network, a WAN and/or a LAN) or other node. The network interfaces 1815 may include wired links (e.g., Ethernet cable) and/or wireless links (e.g., one or more antennas) for intra-network and/or inter-network communications. The network interfaces 1815 may provide wireless communication via one or more transmitters or transmit antennas and one or more receivers or receive antennas, for example. In this example, a single antenna 1845 is shown, which may serve as both transmitter and receiver. However, in other examples there may be separate antennas for transmitting and receiving. The processing system 1800 may also include one or more storage units 1820, which may include a mass storage unit such as a solid state drive, a hard disk drive, a magnetic disk drive and/or an optical disk drive.

The processing system 1800 may include one or more memories 1825, which may include a volatile or non-volatile memory (e.g., a flash memory, a random access memory (RAM), and/or a read-only memory (ROM)). The non-transitory memories 1825 may store instructions for execution by the processing devices 1805, such as to carry out examples described in the present disclosure. The memories 1825 may include other software instructions, such as for implementing an operating system and other applications/functions. In some examples, one or more data sets and/or modules may be provided by an external memory (e.g., an external drive in wired or wireless communication with the processing system 1800) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1830 providing communication among components of the processing system 1800. The bus 1830 may be any suitable bus architecture including, for example, a memory bus, a peripheral bus or a video bus. In FIG. 20, the input devices 1835 (e.g., a keyboard, a mouse, a microphone, a touchscreen, and/or a keypad) and output devices 1840 (e.g., a display, a speaker and/or a printer) are shown as external to the processing system 1800. In other examples, one or more of the input devices 1835 and/or the output devices 1840 may be included as a component of the processing system 1800.

Figure 21:
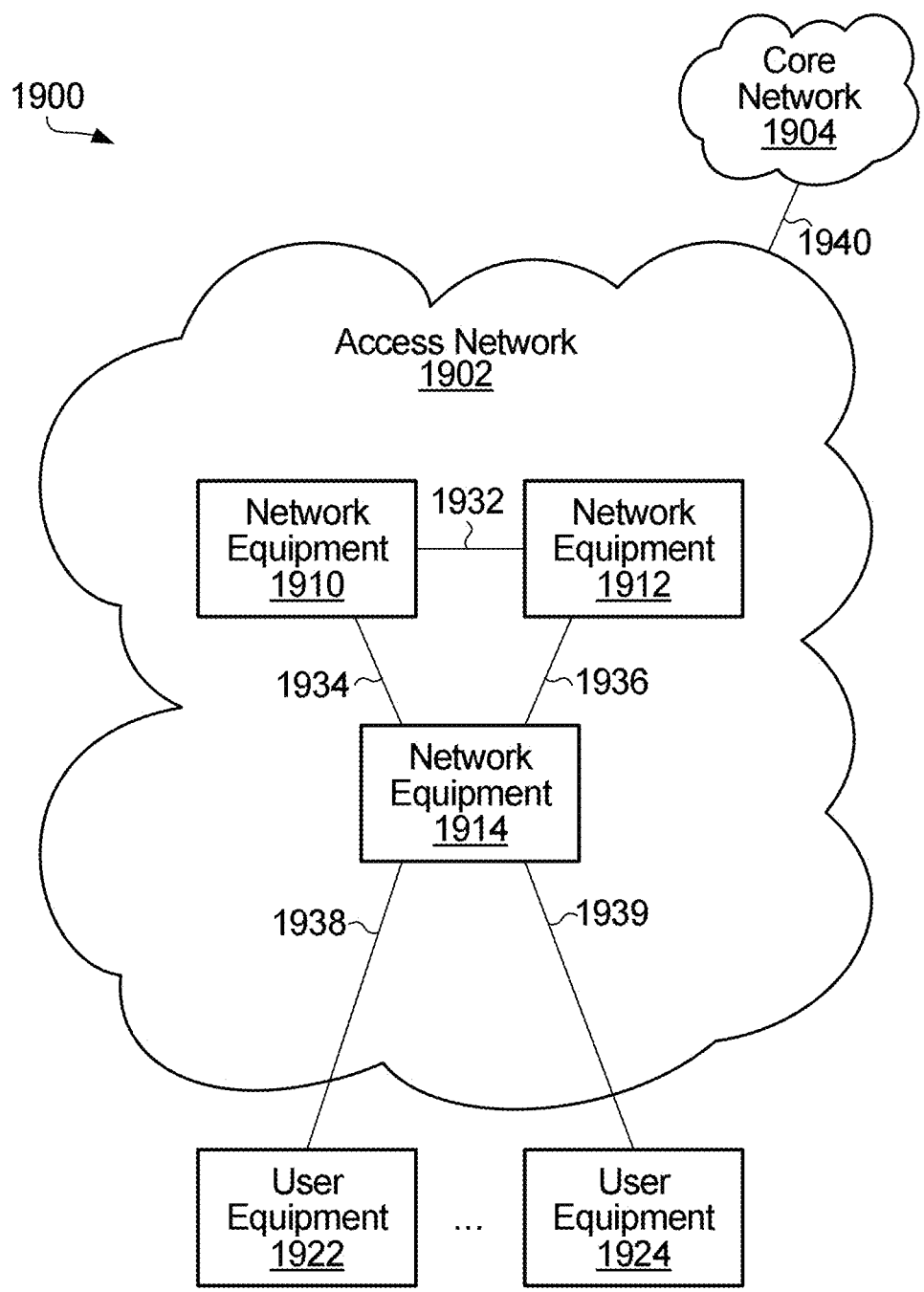
FIG. 21 is a block diagram of an example communication system.

FIG. 21 is a block diagram of an example communication system in which embodiments of the present disclosure could be implemented. The example communication system 1900 in FIG. 21 includes an access network 1902 and a core network 1904. The access network 1902 includes network equipment 1910, 1912, 1914 which communicates over network communication links 1932, 1934, 1936, and user equipment 1922, 1924 which communicates with network equipment 1914 in the example shown, over access communication links 1938, 1939. The access network 1902 communicates with the core network 1904 over another network communication link 1940. The core network 1904, like the access network 1902, may include network equipment that communicates with one or more installations of the network equipment 1910, 1912, 1914 in the access network 1902. However, in a communication system with an access network 1902 and a core network 1904, the core network might not itself directly provide communication service to user equipment.

The communication system 1900 is intended solely as an illustrative example. An access network 1902 could include more or fewer than three installations of network equipment, for example, which might or might not all directly communicate with each other as shown. Also, more than one installation of network equipment in the access network 1902 could provide communication service to user equipment. There could be more than one access network 1902 coupled to a core network 1904. It should also be appreciated that the present disclosure is not in any way limited to communication systems having an access network/core network structure.

Considering the access network 1902, any of various implementations are possible. The exact structure of network equipment 1910, 1912, 1914, and user equipment 1922, 1924 for which such network equipment provides communication service, is implementation-dependent. The apparatus 1600, 1700, 1800 in FIGS. 18 to 20 are examples of communication equipment that could be implemented at user equipment 1922, 1924 and/or network equipment 1910, 1912, 1914.

At least the network equipment 1914 that provides communication service to the user equipment 1922, 1924 includes a physical interface and communications circuitry to support access-side communications with the user equipment over the access links 1938, 1939. The access-side physical interface could be in the form of an antenna or an antenna array, for example, where the access communication links 1938, 1939 are wireless links. In the case of wired access communication links 1938, 1939, an access-side physical interface could be a port or a connector to a wired communication medium. Multiple access-side interfaces could be provided at the network equipment 1914 to support multiple access communication links 1938, 1939 of the same type or different types, for instance. The type of communications circuitry coupled to the access-side physical interface or interfaces at the access network equipment 1914 is dependent upon the type or types of access communication links 1938, 1939 and the communication protocol or protocols used to communicate with the user equipment 1922, 1924.

The network equipment 1910, 1912, 1914 also includes a network-side physical interface, or possibly multiple network-side physical interfaces, and communications circuitry to enable communications with other network equipment in the access network 1902. At least some installations of network equipment 1910, 1912, 1914 also include one or more network-side physical interfaces and communications circuitry to enable communications with core network equipment over the communication link 1940. There could be multiple communication links between network equipment 1910, 1912, 1914 and the core network 1904. Network-side communication links 1932, 1934, 1936 in the access network 1902, and the communication link 1940 to the core network 1904, could be the same type of communication link. In this case the same type of physical interface and the same communications circuitry at the network equipment 1910, 1912, 1914 could support communications between access network equipment within the access network 1902 and between the access network 1902 and the core network 1904. Different physical interfaces and communications circuitry could instead be provided at the network equipment 1910, 1912, 1914 for communications within the access network 1902 and between the access network 1902 and the core network 1904.

Network equipment in the core network 1904 could be similar in structure to the network equipment 1910, 1912, 1914. However, as noted above, network equipment in the core network 1904 might not directly provide communication service to user equipment and therefore might not include access-side physical interfaces for access communication links or associated access-side communications circuitry. Physical interfaces and communications circuitry at network equipment in the core network 1904 could support the same type or types of network communication link or links as in the access network 1902, different type or types of network communication link or links, or both.

Just as the exact structure of physical interfaces at network equipment 1910, 1912, 1914 and network equipment in the core network 1904 is implementation-dependent, the associated communications circuitry is implementation-dependent as well. In general, hardware, firmware, components which execute software, or some combination thereof, might be used in implementing such communications circuitry. Examples of electronic devices that might be suitable for implementing communications circuitry are provided above.

Each installation of user equipment 1922, 1924 includes a physical interface and communications circuitry compatible with an access-side physical interface and communications circuitry at the network equipment 1914, to enable the user equipment to communicate with the network equipment. Multiple physical interfaces of the same or different types could be provided at the user equipment 1922, 1924. The user equipment 1922, 1924 could also include such components as input/output devices through which functions of the user equipment are made available to a user. In the case of a wireless communication device such as a smartphone, for example, these functions could include not only communication functions, but other local functions which need not involve communications. Different types of user equipment 1922, 1924, such as different smartphones for instance, could be serviced by the same network equipment 1914.

Any of the communication links 1932, 1934, 1936, 1938, 1939, 1940, and communication links in the core network 1904 could potentially be or include wireless communication links. Such communication links tend to be used more often within an access network 1902 than in a core network 1904, although wireless communication links at the core network level are possible.

Embodiments of the present disclosure can potentially provide more flexibility compared to the conventional SCMA solutions by appropriate design of sparsity patterns and sets of QAM modulators based on layer index, spectral efficiency, and other communications parameters, such as FEC rate. Furthermore, no additional signaling may be needed to convey information about the sparsity pattern or the QAM modulators to the receiver, because this information can be obtained by layer index and MCS signaling.

Embodiments of the present disclosure potentially provide better performance compared to the original SCMA solution in terms of lower decoding complexity due to requiring only tone-by-tone MAP instead of the message passing algorithm (MPA) because there is no redundancy across tones. The decoding complexity may be also be reduced by reducing the total number of possible combinations (hypothesis) due to flexibility in choosing the QAM modulations. For example, referring again to FIG. 8, with 6 layers, the total number of calculations per tone is 24 on average compared to 64 for the conventional 8-point 4-projection SCMA codebook, which means there is a complexity reduction on the order of 2.6 times.

Embodiments of the present disclosure may provide particularly good solutions for various application scenarios in next generation wireless communication networks, including massive machine type communication (mMTC), Ultra-Reliable Low-Latency Communications (URLLC), and enhanced mobile broadband (eMBB) application scenarios.

What has been described is merely illustrative of the application of principles of embodiments of the present disclosure. Other arrangements and methods can be implemented by those skilled in the art.

For example, in the above embodiments, signatures have been associated with tones. These tones may represent OFDM tones. However, in other embodiments, other communication resources (like time slots) can be used instead of frequency tones.

Transmitter apparatus and method features could be implemented, for example, in communication network equipment such as base transceiver stations for downlink communications, and/or in UEs for uplink communications. Similarly, receiver features could be implemented in UEs and/or in network equipment. The components illustrated in the apparatus drawings could be implemented using hardware, firmware, components which execute software, or some combination thereof. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Transmitters and receivers could perform other operations in addition to those described herein, depending on the specific implementation and the types of communication functions and protocols to be supported.

The contents of the drawings are intended solely for illustrative purposes, and the present invention is in no way limited to the particular example embodiments explicitly shown in the drawings and described herein. For example, components such as stream-specific modulators need not necessarily be implemented in separate and distinct physical components, but could instead be implemented in a single modulator. Similarly, FEC decoders need not be implemented in separate physical components.

In addition, although described primarily in the context of methods and systems, other implementations are also contemplated, as instructions stored on a non-transitory processor-readable medium, for example. A non-transitory processor-readable medium could store instructions which, when executed by one or more processors, cause the one or more processors to perform a method as disclosed herein.

What is claimed is:

1. A method comprising:
   mapping a first stream of coded bits associated with a first data layer to $K_1$ binary streams;
   applying a first layer-specific set of stream-specific modulators to the $K_1$ binary streams to generate $K_1$ independent complex-valued symbol streams; and
   transmitting the $K_1$ independent complex-valued symbol streams using $T_1$ resource elements out of $N_1$ resource elements, the $T_1$ resource elements being defined by a first layer-specific signature of length $N_1$, where $1 \leq T_1 < N_1$.

2. The method of claim 1, wherein at least one of the first layer-specific signature and the first layer-specific set of stream-specific modulators is selected based at least in part on at least one of: a layer index associated with the first data layer, a coding rate of a forward error correction (FEC) encoding applied to the first stream of coded bits, or a target spectral efficiency.

3. The method of claim 1, wherein the $T_1$ resource elements out of $N_1$ resource elements comprise $T_1$ tones out of $N_1$ orthogonal frequency-division multiplexing (OFDM) tones.

4. The method of claim 1, wherein the stream-specific modulators are applied by quadrature amplitude modulation (QAM) mappers.

5. The method of claim 1, wherein mapping the first stream of coded bits to $K_1$ binary streams comprises mapping the first stream of coded bits to $K_1$ binary streams such that at least one coded bit is mapped to more than one of the $K_1$ binary streams and none of the $K_1$ binary streams are identical to each other.

6. The method of claim 1, wherein mapping the first stream of coded bits to $K_1$ binary streams comprises dividing the first stream of coded bits to $K_1$ disjoint binary streams.

7. The method of claim 1, further comprising assigning stream-specific transmit powers to the $K_1$ independent complex-valued symbol streams prior to transmission.

8. The method of claim 1, further comprising assigning stream-specific phase rotations to the $K_1$ independent complex-valued symbol streams prior to transmission.

9. The method of claim 1, further comprising:
   mapping a second stream of coded bits associated with a second data layer to $K_2$ binary streams;
   applying a second layer-specific set of stream-specific modulators to the $K_2$ binary streams to generate $K_2$ independent complex-valued symbol streams; and
   transmitting the $K_2$ independent complex-valued symbol streams using $T_2$ resource elements out of $N_2$ resource elements, the $T_2$ resource elements being defined by a second layer-specific signature of length $N_2$, where $1 \leq T_2 \leq N_2$,
   wherein the first and second layer-specific signatures differ in at least one of sparsity pattern and sparsity level.

10. The method of claim 9, wherein the first and second layer-specific sets of stream-specific modulators differ in at least one of a sequence of the stream-specific modulators in each set and a proportion of different stream-specific modulators in each set.

11. The method of claim 9, further comprising assigning at least one of layer-specific transmit powers and layer-specific phase rotations to the independent complex-valued symbol streams prior to transmission.

12. The method of claim 9, wherein the first data layer and the second data layer are transmitted by a user equipment UE1.

13. The method of claim 9, wherein the first data layer is transmitted by a first user equipment UE1 and the second data layer is transmitted by a second user equipment UE2.

14. The method of claim 1, wherein the first data layer is transmitted by a user equipment UE1.

15. The method of claim 1, further comprising selecting the $T_1$ resource elements out of the $N_1$ resource elements corresponding to the first layer-specific signature generated using optical orthogonal codes (OOCs).

16. An apparatus comprising:
   a bit mapper configured to map a first stream of coded bits associated with a first data layer to $K_1$ binary streams;
   a first layer-specific set of stream-specific modulators, operatively coupled to the bit mapper, configured to generate $K_1$ independent complex-valued symbol streams based on the $K_1$ binary streams; and
   a transmitter, operatively coupled to the first layer-specific set of stream-specific modulators, configured to transmit the $K_1$ independent complex-valued symbol streams using $T_1$ resource elements out of $N_1$ resource elements, the $T_1$ resource elements being defined by a first layer-specific signature of length $N_1$, where $1 \leq T_1 < N_1$.

17. The apparatus of claim 16, further comprising a controller to configure the bit mapper and the first layer-specific set of stream-specific modulators based at least in part on at least one of: a layer index associated with the first data layer, a coding rate of a forward error correction (FEC) encoding applied to the first stream of coded bits, or a target spectral efficiency.

18. The apparatus of claim 16, wherein the $T_1$ resource elements out of $N_1$ resource elements comprise $T_1$ tones out of $N_1$ orthogonal frequency-division multiplexing (OFDM) tones.

19. The apparatus of claim 16, wherein the stream-specific modulators are quadrature amplitude modulation (QAM) mappers.

20. The apparatus of claim 16, wherein the bit mapper maps the first stream of coded bits to $K_1$ binary streams such that at least one coded bit is mapped to more than one of the $K_1$ binary streams and none of the $K_1$ binary streams are identical to each other.

21. The apparatus of claim 16, wherein the bit mapper divides the first stream of coded bits to $K_1$ disjoint binary streams.

22. The apparatus of claim 16, further comprising a power scaler, operatively coupled between the modulators and the transmitter, configured to assign stream-specific transmit powers to the $K_1$ independent complex-valued symbol streams prior to transmission.

23. The apparatus of claim 16, further comprising a phase rotator, operatively coupled between the modulators and the transmitter, configured to assign stream-specific phase rotations to the $K_1$ independent complex-valued symbol streams prior to transmission.

24. The apparatus of claim 16, further comprising:
a second bit mapper configured to map a second stream of coded bits associated with a second data layer to $K_2$ binary streams;
a second layer-specific set of stream-specific modulators, operatively coupled to the second bit mapper, configured to generate $K_2$ independent complex-valued symbol streams based on the $K_2$ binary streams;
wherein the transmitter is operatively coupled to the second layer-specific set of stream-specific modulators and transmits the $K_2$ independent complex-valued symbol streams using $T_2$ resource elements out of $N_2$ resource elements, the $T_2$ resource elements being defined by a second layer-specific signature of length $N_2$, where $1 \leq T_2 \leq N_2$ and the first and second layer-specific signatures differ in at least one of sparsity pattern and sparsity level.

25. The apparatus of claim 24, wherein the first and second layer-specific sets of stream-specific modulators differ in at least one of a sequence of the stream-specific modulators in each set and a proportion of different stream-specific modulators in each set.

26. The apparatus of claim 24, further comprising:
a first power scaler, operatively coupled between the first layer-specific set of stream-specific modulators and the transmitter, configured to assign a first layer-specific vector of stream-specific transmit powers to the $K_1$ independent complex-valued symbol streams prior to transmission; and
a second power scaler, operatively coupled between the second layer-specific set of stream-specific modulators and the transmitter, configured to assign a second layer-specific vector of stream-specific transmit powers to the $K_2$ independent complex-valued symbol streams prior to transmission.

27. The apparatus of claim 24, further comprising:
a first phase rotator, operatively coupled between the first layer-specific set of stream-specific modulators and the transmitter, configured to assign a first layer-specific vector of stream-specific phase rotations to the $K_1$ independent complex-valued symbol streams prior to transmission; and
a second phase rotator, operatively coupled between the second layer-specific set of stream-specific modulators and the transmitter, configured to assign a second layer-specific vector of stream-specific phase rotations to the $K_1$ independent complex-valued symbol streams prior to transmission.

28. The apparatus of claim 24, wherein the apparatus is a user equipment UE1.

29. The apparatus of claim 16, wherein the apparatus is a user equipment UE1.

30. The apparatus of claim 16, wherein the apparatus is a first user equipment UE1, and wherein a second layer is transmitted by a second user equipment UE2.

31. The apparatus of claim 16, further comprising a controller configured to select the $T_1$ resource elements out of the $N_1$ resource elements corresponding to the first layer-specific signature generated using optical orthogonal codes (OOCs).

* * * * *